(12) United States Patent
Tinsman

(10) Patent No.: US 9,344,470 B2
(45) Date of Patent: May 17, 2016

(54) METHODS AND SYSTEMS FOR DATA TRANSMISSION

(71) Applicant: OpenTV, Inc., San Francisco, CA (US)

(72) Inventor: John Tinsman, Fallbrook, CA (US)

(73) Assignee: OpenTV, Inc., San Francisco, CA (US)

(*) Notice: Subject to any disclaimer, the term of this patent is extended or adjusted under 35 U.S.C. 154(b) by 150 days.

(21) Appl. No.: 14/312,542

(22) Filed: Jun. 23, 2014

(65) Prior Publication Data

US 2014/0304424 A1    Oct. 9, 2014

Related U.S. Application Data

(63) Continuation of application No. 13/619,062, filed on Sep. 14, 2012, now Pat. No. 8,782,305, which is a continuation of application No. 13/089,070, filed on Apr. 18, 2011, now Pat. No. 8,335,873, which is a continuation-in-part of application No. 11/531,728, filed on Sep. 14, 2006, now Pat. No. 7,930,449.

(51) Int. Cl.
*G06F 3/00* (2006.01)
*G06F 13/00* (2006.01)
*H04L 29/06* (2006.01)
(Continued)

(52) U.S. Cl.
CPC ............ *H04L 65/4076* (2013.01); *H04L 47/10* (2013.01); *H04L 47/22* (2013.01); *H04L 65/605* (2013.01); *H04L 65/607* (2013.01); *H04L 67/28* (2013.01); *H04L 67/2819* (2013.01); *H04N 21/23406* (2013.01); *H04N 21/234327* (2013.01); *H04N 21/4384* (2013.01); *H04N 21/44004* (2013.01); *H04N 21/4431* (2013.01); *H04N 21/64769* (2013.01)

(58) Field of Classification Search
None
See application file for complete search history.

(56) References Cited

U.S. PATENT DOCUMENTS

| 4,774,687 A | 9/1988 | Taniguchi et al. |
| 5,742,347 A | 4/1998 | Kandlur et al. |
(Continued)

FOREIGN PATENT DOCUMENTS

| WO | WO-9828915 A2 | 7/1998 |
| WO | WO-0180570 A2 | 10/2001 |
(Continued)

OTHER PUBLICATIONS

"European Application Serial No. 12774444.9, Extended European Search Report mailed Sep. 10, 2014", 6 pgs.
(Continued)

*Primary Examiner* — Michael Sun
(74) *Attorney, Agent, or Firm* — Schwegman Lundberg & Woessner, P.A.

(57) ABSTRACT

Example methods and systems for transmitting data are presented. In one example, a plurality of streams of video data may be received from at least one data source into at least one buffer of a router. Each of the streams of video data may represent a same video program, wherein each of the streams of video data may correspond to a unique visual resolution relative to at least some other streams, and wherein each of the streams of video data may include a plurality of contiguous, non-overlapping portions of video data. A request may be received from a device to transmit a single one of the portions of video data to the device. In response to the request, a portion of one of the streams of video data may be transmitted from the at least one buffer of the router to the device.

21 Claims, 32 Drawing Sheets

(51) Int. Cl.

| | | |
|---|---|---|
| *H04L 12/801* | (2013.01) | |
| *H04L 12/815* | (2013.01) | |
| *H04N 21/234* | (2011.01) | |
| *H04N 21/2343* | (2011.01) | |
| *H04N 21/438* | (2011.01) | |
| *H04N 21/44* | (2011.01) | |
| *H04N 21/443* | (2011.01) | |
| *H04N 21/647* | (2011.01) | |
| *H04L 29/08* | (2006.01) | |

(56) References Cited

U.S. PATENT DOCUMENTS

| | | | |
|---|---|---|---|
| 5,872,588 | A | 2/1999 | Aras et al. |
| 6,219,358 | B1 | 4/2001 | Pinder et al. |
| 6,389,489 | B1 | 5/2002 | Stone et al. |
| 6,675,387 | B1 | 1/2004 | Boucher et al. |
| 6,934,340 | B1 * | 8/2005 | Dollard ............... H04L 27/2608 375/260 |
| 6,971,121 | B2 | 11/2005 | West et al. |
| 7,295,758 | B2 | 11/2007 | Kikuchi et al. |
| 7,376,716 | B2 | 5/2008 | Dilley et al. |
| 7,835,365 | B2 * | 11/2010 | Ayyagari ............... H04L 29/06 370/395.3 |
| 7,930,449 | B2 | 4/2011 | Tinsman |
| 8,135,040 | B2 | 3/2012 | Cuijpers et al. |
| 8,335,873 | B2 | 12/2012 | Tinsman |
| 8,782,305 | B2 | 7/2014 | Tinsman |
| 2001/0025377 | A1 | 9/2001 | Hinderks |
| 2002/0059623 | A1 | 5/2002 | Rodriguez |
| 2002/0168178 | A1 | 11/2002 | Rodriguez et al. |
| 2002/0194361 | A1 | 12/2002 | Itoh et al. |
| 2003/0149989 | A1 | 8/2003 | Hunter et al. |
| 2004/0047417 | A1 | 3/2004 | Gordon et al. |
| 2004/0088347 | A1 | 5/2004 | Yeager et al. |
| 2004/0114567 | A1 | 6/2004 | Kubler et al. |
| 2004/0136352 | A1 | 7/2004 | Fu et al. |
| 2004/0175133 | A1 | 9/2004 | Kashiwagi et al. |
| 2004/0223614 | A1 | 11/2004 | Seaman |
| 2005/0008002 | A1 | 1/2005 | Kubler et al. |
| 2005/0122974 | A1 | 6/2005 | Hubler |
| 2005/0175018 | A1 | 8/2005 | Wong |
| 2007/0064673 | A1 | 3/2007 | Bhandaru et al. |
| 2007/0098007 | A1 | 5/2007 | Prodan et al. |
| 2007/0121629 | A1 | 5/2007 | Cuijpers et al. |
| 2007/0160048 | A1 | 7/2007 | Faucheux et al. |
| 2007/0258699 | A1 | 11/2007 | Kikuchi et al. |
| 2008/0126558 | A1 | 5/2008 | Tinsman et al. |
| 2008/0273079 | A1 | 11/2008 | Campbell et al. |
| 2008/0301315 | A1 | 12/2008 | Cheng et al. |
| 2009/0023453 | A1 * | 1/2009 | Hu ....................... H04W 48/17 455/452.1 |
| 2009/0177833 | A1 | 7/2009 | Norman |
| 2009/0252134 | A1 | 10/2009 | Schlicht et al. |
| 2009/0279548 | A1 | 11/2009 | Davis et al. |
| 2010/0287238 | A1 | 11/2010 | Setton et al. |
| 2011/0255535 | A1 | 10/2011 | Tinsman |
| 2012/0259994 | A1 * | 10/2012 | Gillies ............... H04L 12/1881 709/231 |
| 2013/0010793 | A1 | 1/2013 | Tinsman |

FOREIGN PATENT DOCUMENTS

| | | |
|---|---|---|
| WO | WO-2011038013 A2 | 3/2011 |
| WO | WO-2012145411 A1 | 10/2012 |

OTHER PUBLICATIONS

"Mexican Application Serial No. MX/a/2013/012210, Office Action mailed Oct. 30, 2014", with English machine translation, 4 pgs.

"U.S. Appl. No. 11/531,728, Final Office Action mailed Apr. 15, 2009", 25 pgs.

"U.S. Appl. No. 11/531,728, Advisory Action mailed Jul. 6, 2009", 3 pgs.

"U.S. Appl. No. 11/531,728, Final Office Action mailed Mar. 17, 2010", 29.

"U.S. Appl. No. 11/531,728, Non-Final Office Action mailed Aug. 6, 2008", OARN, 23 Pgs.

"U.S. Appl. No. 11/531,728, Non-Final Office Action mailed Sep. 17, 2009", 26 Pgs.

"U.S. Appl. No. 11/531,728, Notice of Allowance mailed Feb. 10, 2011", 11 pgs.

"U.S. Appl. No. 11/531,728, Preliminary Amendment filed Jan. 19, 2007", 8 pgs.

"U.S. Appl. No. 11/531,728, Response filed Jun. 15, 2009 to Final Office Action mailed Apr. 15, 2009", 16 pgs.

"U.S. Appl. No. 11/531,728, Response filed Aug. 17, 2010 to Final Office Action mailed Mar. 17, 2010", 29 pgs.

"U.S. Appl. No. 11/531,728, Response filed Jan. 5, 2009 to Non-Final Office Action mailed Aug. 6, 2008", 17 pgs.

"U.S. Appl. No. 11/531,728, Response filed Dec. 17, 2009 to Non Final Office Action mailed Sep. 17, 2009", 21 pgs.

"U.S. Appl. No. 13/089,070, Final Office Action mailed May 8, 2012", 11 pgs.

"U.S. Appl. No. 13/089,070, Non Final Office Action mailed Nov. 30, 2011", 13 pgs.

"U.S. Appl. No. 13/089,070, Notice of Allowance mailed Aug. 23, 2012", 9 pgs.

"U.S. Appl. No. 13/089,070, Response filed Feb. 29, 2012 to Non Final Office Action mailed Nov. 30, 2011", 11 pgs.

"U.S. Appl. No. 13/089,070, Response filed Aug. 8, 2012 to Final Offce Action mailed May 8, 2012", 6 pgs.

"U.S. Appl. No. 13/619,062, Final Office Action mailed Sep. 24, 2013", 17 pgs.

"U.S. Appl. No. 13/619,062, Non Final Office Action mailed Feb. 15, 2013", 15 pgs.

"U.S. Appl. No. 13/619,062, Notice of Allowance mailed Mar. 10, 2014", 9 pgs.

"U.S. Appl. No. 13/619,062, Response filed Feb. 24, 2014 to Final Office Action mailed Sep. 24, 2013", 11 pgs.

"U.S. Appl. No. 13/619,062, Response filed Jul. 15, 2013 to Non Final Office Action mailed Feb. 15, 2013", 12 pgs.

"European Application Serial No. 07116167, European Search Report mailed Mar. 14, 2008", 3 pgs.

"European Application Serial No. 07116167.3, EP Office Action mailed Oct. 9, 2008", 3 pgs.

"European Application Serial No. 07116167.3, Office Action mailed Jan. 28, 2010", 3 pgs.

"European Application Serial No. 07116167.3, Office Action mailed Feb. 28, 2011", 5 pgs.

"European Application Serial No. 07116167.3, Office Action Response Filed Jul. 1, 2011", 3 pgs.

"International Application Serial No. PCT/US2012/034101, International Preliminary Report on Patentability mailed Oct. 31, 2013", 6 pgs.

"International Application Serial No. PCT/US2012/034101, International Search Report mailed Jul. 5, 2012", 4 pgs.

"International Application Serial No. PCT/US2012/034101, Written Opinion mailed Jul. 5, 2012", 10 pgs.

\* cited by examiner

METHODS AND SYSTEMS FOR DATA TRANSMISSION

RELATED APPLICATIONS

This application is a continuation of U.S. application Ser. No. 13/619,062, filed on Sep. 14, 2012, titled "METHODS AND SYSTEMS FOR DATA TRANSMISSION," which is a continuation of U.S. application Ser. No. 13/089,070. titled "METHODS AND SYSTEMS FOR DATA TRANSMISSION," filed on Apr. 18, 2011, now U.S. Pat. No. 8,335,873, issued Dec. 18, 2012which is a continuation-in-part of U.S. application Ser. No. 11/531,728, titled entitled "METHOD AND SYSTEM FOR DATA TRANSMISSION," filed Sep. 14, 2006, now U.S. Pat. No. 7,930,449, issued Apr. 19, 2011, which applications are hereby incorporated by reference herein in their entirety.

FIELD

This application relates generally to the field of electronic communications and, in an example embodiment, to a method and system to transmit data.

BACKGROUND

An internet protocol (IP) delivery system (e.g., to provide video content and/or directory data) may use a multicast data transmission protocol to improve scalability. Much of the data delivered in the system may be hierarchical in nature, such that certain data in a data set is received before a receiver can make use of the remainder of that data set. The receiver typically waits for an access point (e.g. the starting or top element) in the data set to enable processing of the remaining elements of the data set. Waiting for an access point may introduce an undesirable delay, which can adversely affect a receiver's performance and an experience of a user of the system.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Data may be transmitted through a networked system (e.g., an interactive television system) that is received by a receiving device (e.g., a switch/router) and distributed to one or more intermediate devices, ultimately for presentation on user devices. In an embodiment, the receiving device may attempt to de jitter the data retained within a buffer by selecting a known data rate, selecting a provided data rate or calculating the data rate so that the retained data may be provided at a fixed data rate.

The transmitted data may be hierarchical, where portions of the data may use an access point to decode prior and/or subsequently received data. In an embodiment, the receiving device may provide one or more additional access points in the data that it provides to the intermediate device, which may enable faster access to the hierarchical data.

In response to data requests, the receiving device may provide initial data and additional data to enable the intermediate device to present the content. The initial data may include an access point, which may be used to enable decoding of remaining initial data and/or the additional data.

In an example embodiment, the initial data may include intermediate join data that includes data that has been identified as access points. Retained data may also be used to reconstruct one more access points on the receiving device as intermediate join data.

In an example embodiment, the retained data may be buffered on the receiving device in segments starting at an access point that may be provided as the initial data.

Example Data Distribution System

Figure 1:
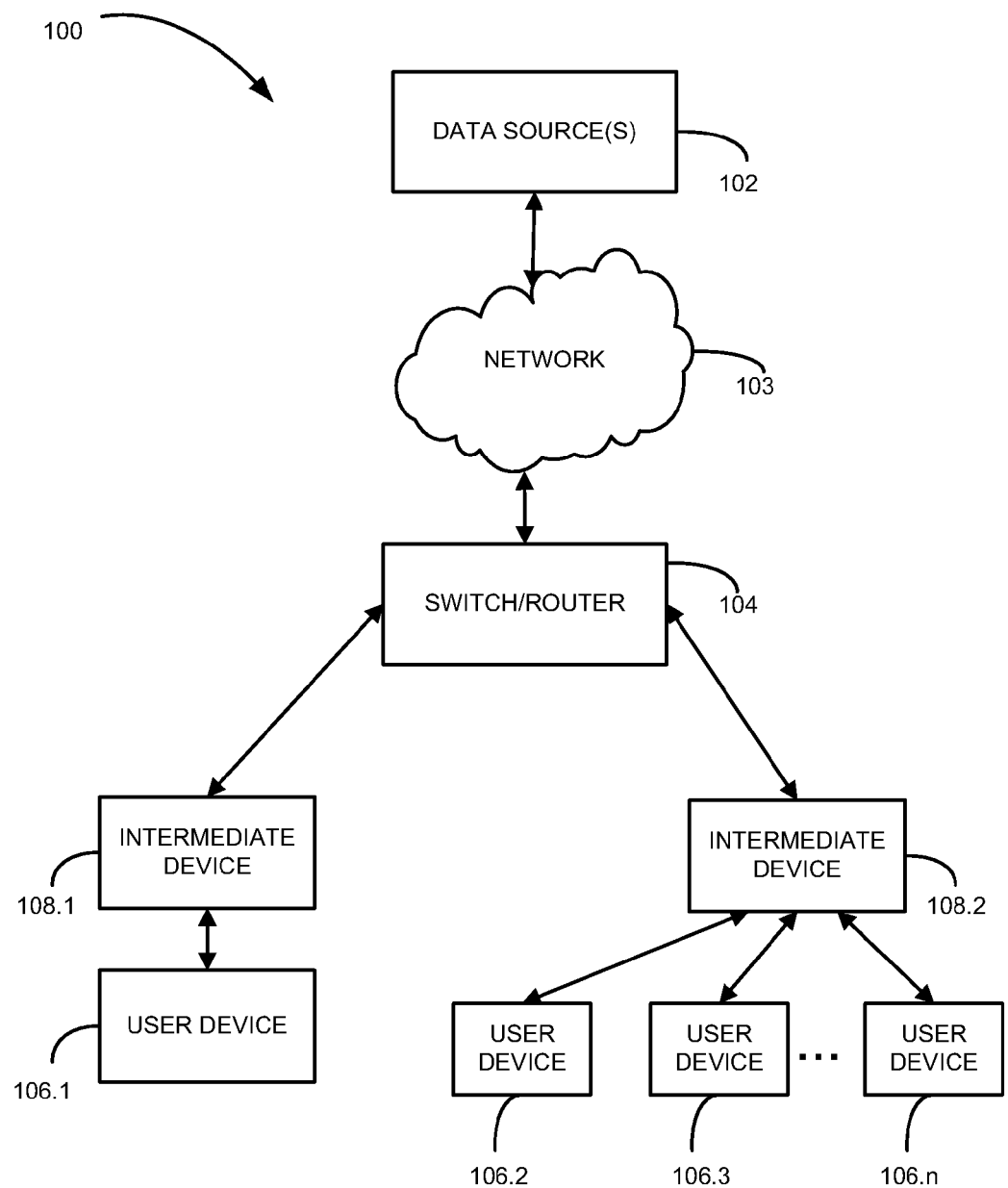
FIG. 1 is a block diagram of a system for distributing data to a switch/router in accordance with an example embodiment.

Referring to FIG. 1, an example embodiment of a system 100 for distributing data to a switch/router is illustrated. A data source 102 may provide data to a network device (e.g., a switch or router 104) over a network 103. In an example embodiment, the data source 102 may aggregate data from a number of sources of data.

In an example embodiment, the data may include media such as video content in the form of a movie or television program and/or digital music content such as an MP3 file. In an example embodiment, the data may be sequential, such as frames of video content. Further, the data may be hierarchical such that encoding of successive frames and/or packets of the data may use data relative techniques. Such a hierarchical technique may be used with compressed video content. In an example embodiment, the data may provide a video game, a patch file, an interactive application data, and/or the like. In an example embodiment, the data may include informational content. It should be appreciated that other types of data may also be used with the system 100.

The switch/router 104 may route data to and receive data from devices such as the intermediate devices 108.1, 108.2 through the network 103. The network 103 may include a private network, a public network such as the Internet, an access network, or combinations of the private network, the public network and/or the access network. In an example embodiment, the switch/router 104 may include a Digital Subscriber Line Access Multiplexer (DSLAM).

The network 103 may be an internet protocol (IP) network, a telephone network, a cable network, a core delivery network, or any other network to deliver digital data. In an example embodiment, the data may be provided to the switch/router 104 over the network 103 via a multicast transmission protocol, a unicast transmission protocol, or any other protocol suitable for communicating digital data.

The switch/router 104 may be located at a home or a business location and may be an edge router. In an example embodiment, the switch/router 104 may inspect incoming packets of data to determine a packet type and take type-specific action.

In an example embodiment, a size of one or more buffers of the router/switch 104 may be pre-defined on the switch/router 104. The size of one or more buffers of the switch/router 104 may, however, be determined empirically by the switch/router 104. In an example embodiment, the size of the buffer may be sufficient to retain initial data to be sent to a requester. For example, the size of the buffer may be sufficient to retain a group of pictures (GOP) or its equivalent. In an example embodiment, the size of the buffer may be sufficient to retain a span of data between two access points.

A non-networked intermediate device 108.1 may provide the data to a user device 106.1. Examples of the non-networked intermediate device 108.1 include a set top box (STB), a digital video recorder (DVR), a video decoder, a computer system, and the like. A networked intermediate device 108.2 may provide the data to a number of user devices 106.2-106.$n$. Examples of the networked intermediate device 108.2 may include a STB, a DVR, a video decoder, a computer system, a server, and the like. For example, the networked intermediate device 108.2 may include a STB and the user devices 106.2-106.$n$ may be televisions. For example, the STB may distribute received content to multiple televisions within a home or connected to a network.

It will be appreciated that the intermediate devices 108.1, 108.2 may be located at a single location, such as a home or a place of business occupied by an operator of the user devices 106.1-106.$n$.

In an example embodiment, the intermediate devices 108.1, 108.2 may transmit received data to other devices including additional intermediate devices 108.1, 108.2. For example, the intermediate devices 108.1, 108.2 may retain received data.

The user devices 106.1-106.$n$ may include any display device (with or without receiver capability) including televisions, monitors, computer systems, digital media players, gaming devices, mobile phones, personal digital assistants (PDAs), and the like. Software may be provided on the user devices 106.1-106.$n$ to configure the devices 106.1-106.$n$ to render media content to a user.

In an example embodiment, the user device 106.1 may be combined with the intermediate device 108.1 in a combination device.

Example Interactive Television Environment

Figure 2:
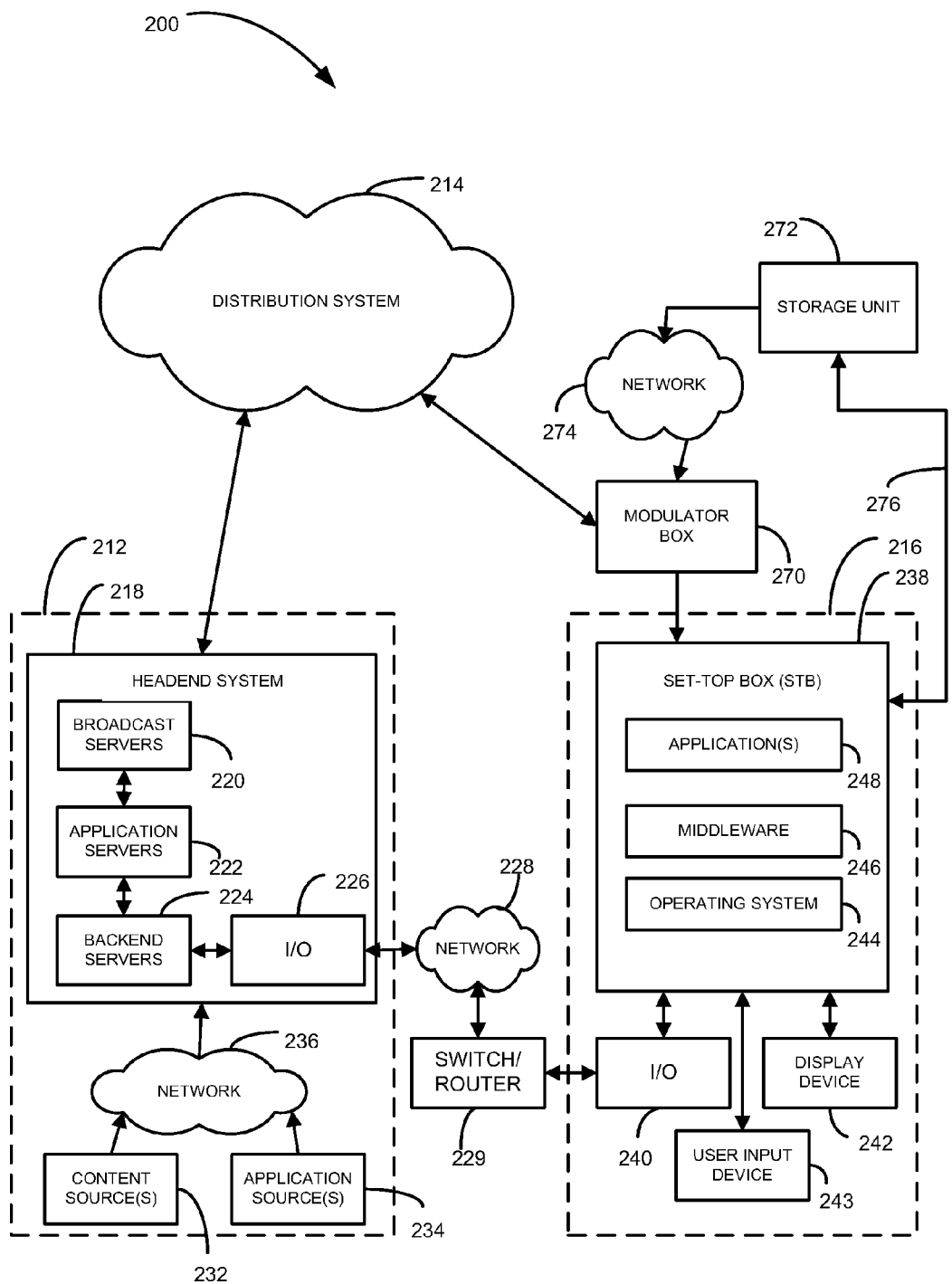
FIG. 2 illustrates a diagrammatic representation of an example interactive television environment.

FIG. 2 is a diagrammatic representation of an example interactive television environment 200. The interactive television environment 200 may be implemented in the system 100 (see FIG. 1). The interactive television environment 200 may include a source system 212 that communicates data (e.g., television/video content data and interactive application data) via a distribution network or system 214 and one or more modulator boxes 270 to a receiver system 216. In other example embodiments, the modulator box 270 may be replaced with (or include) a PCI board, a USB dongle or the like. In one example embodiment, the interactive television environment 200 may optionally include a storage unit 272 (e.g., personal computer) that communicates stored data via a network 274 to the modulator box 270 which, in turn, communicates the stored data, television content data, and interactive application data to the receiver system 216. The modulator box 270, the storage unit 272, and the receiver system 216 may be co-located in a subscriber's home. Thus, in one embodiment, the modulator box 270 may combine television content data and interactive application data received from the remote source system 212 with local stored data provided by the storage unit 272 provided at the subscriber's home. It may be appreciated that the storage unit 272 may be any computer device running appropriate software (e.g., Linux or Microsoft Windows). In an example embodiment, the modulator box 270 may be located within a head-end system 218.

Turning first to the source system 212, an example headend system 218 operates to communicate the data as a broadcast transmission. To this end, the headend system 218 is shown to include one or more broadcast servers 220 and, optionally, one or more application servers 222. Each of the broadcast servers 220 may operate to receive, encode, packetize, multiplex, modulate, and broadcast data from various sources and of various types. While the example embodiment is described herein as transmitting data from the headend system 218 as a broadcast, it will be appreciated that the relevant data could also be unicast or multicast from the source system 212 via the distribution system 214 and the modulator box 270 to the receiver system 216. In various embodiments, data could also be transmitted from the source system 212 via a network connection to the receiver system 216.

Each application server 222, in one example embodiment, may serve to compile and provide interactive data modules to the broadcast server 220. The interactive data modules may also include data that is utilized by an interactive television application. An application server 222 may also include multiplexing functionality to enable multiplexing of, for example, interactive television applications and associated data with audio and video signals received from various sources. An application server 222 may also have the capability to feed (e.g., stream) multiple interactive television applications to one or more broadcast servers 220 for distribution to the receiver system 216. To this end, each application server 222 may implement a so-called "carousel", whereby code and data modules are provided to a broadcast server 220 in a cyclic, repetitive manner for inclusion within a transmission from the headend system 218. In other embodiments, code may reside permanently in the set-top box 238 (e.g., the code may be stored in non-volatile memory of the set-top box 238), may be pushed or downloaded to the set-top box 238, or be provided to the set-top box 238 in any other manner. In an example embodiment, the application servers 222 may communicate directly with communications I/O interface, such that inputs may be multiplexed from broadcast servers 220, data servers, and application servers 222 to generate various broadcast streams.

The headend system 218 is also shown by way of example to include one or more backend servers 224, which are coupled to the application servers 222 and to a communications I/O interface in the example form of a modem pool 226. In an example embodiment, the communications I/O interface may be a network interface, such that IP traffic is provided for an entire path to a DSLAM or equivalent. In the example modem pool configuration, the modem pool 226 may be coupled to receive data from the receiver systems 216 via a network 228 (e.g., the Internet) through a switch/router 229 and to provide this data to the backend servers 224. The backend servers 224 may then provide the data, received from the receiver system 216, to the application servers 222 and the broadcast servers 220. Accordingly, the switch/router 229, network 228 and the modem pool 226 may operate as a return channel whereby a receiver system 216 is provided with interactivity with the source system 212. Data provided to the headend system 218 via the return channel may include, merely for example, user input to an interactive television application executed at the receiver system 216 or data that is generated by the receiver system 216 and communicated to the source system 212. It will however be appreciated that any data may be communicated via the return channel (e.g., statistical data, data metering user viewing selections, etc.). The return channel 230 may also provide a channel whereby programs, targeted advertisements/commercials, and applications from the source system 212 are provided to the receiver system 216.

Within the source system 212, the headend system 218 may optionally to receive data (e.g., content, code and application data) from external sources. For example, FIG. 2 illustrates the headend system 218 as being coupled to one or more content sources 232 and one or more application sources 234 via a network 236 (e.g., the Internet). For example, a content source 232 may be a provider of entertainment content (e.g., movies), a provider of real-time dynamic data (e.g., weather information), a plurality of targeted advertisements, prime time viewing advertisements, or the like. An application source 234 may be a provider of any interactive television application. For example, one or more application sources 234 may provide a TV Media Player Application, Electronic Program Guide (EPG) and navigation applications, messaging and communication applications, information applications, sports applications, and/or games and gaming applications.

Turning now to the example distribution system 214, the distribution system 214 may, in one embodiment, support the broadcast distribution of data from the source system 212 to the receiver system 216. As shown, the distribution network or system 214 may comprise a satellite, cable, terrestrial or Digital Subscribers Line (DSL) network, or any other data communication network or combination of such networks.

The receiver system 216 is shown, in one example embodiment, to include a receiver device in the example form of a set-top box (STB) 238 that receives data (primary and secondary content streams) via the distribution system 214 and the modulator box 270, a communications I/O interface in the example form of a modem 240 for return channel communications with the headend system 218. It will be appreciated that the communication I/O interfaces 226, 240 may be selected dependent upon the nature of the network 228. For example, the communications I/O interfaces 226, 240 may include a cable return module, a DSL return module, or the like. The receiver system 216 is also shown to include other optional external systems such as a user input device 243 (e.g., a keyboard, remote control, mouse etc.) and a display device 242, coupled to the set-top box 238, for the display of content received at the set-top box 238. In one example embodiment, the display device 242 may be a television set.

The set-top box 238 may execute three layers of software, namely an operating system 244, middleware 246 and, optionally, one or more interactive television applications 248. The middleware 246 may operate to shield the interactive television application 248 from differences of various operating systems 244 and differences in hardware of different set-top boxes 238. To this end, the middleware 246 may provide driver Application Program Interfaces (APIs) and a library to translate instructions received from an interactive television or stored data application 248 into low-level commands that may be understood by set-top box hardware (e.g., modems, interface ports, smart card readers, etc.). In one example embodiment, the middleware 246 may include extraction functionality to extract a selected tertiary video stream. For example, the middleware 246 may include crop and scale functionality to crop a portion or subset of an active display area provided by the secondary video stream, and scale the cropped portion or subset for display on the display device 242 so as to encompass an entire display area of the display device 242.

The modulator box 270, in one example embodiment, may receive stored data from the storage unit 272 and a broadcast transmission from the source system 212. The modulator box 270 may multiplex the stored data into the broadcast transmission thereby generating a second transmission that is communicated to the receiver system 216. It will however be appreciated that storage unit functionality is optional. The storage unit 272 may store data and, upon request, communicate the stored data to the modulator box 270 over the network 274 (e.g., Ethernet). The storage unit 272 may communicate the stored data in response to commands that are entered by a user from the set-top box 238 and communicated to the storage unit 272 over the link 276. The link 276 may be any wired or wireless link over which digital data may be communicated (e.g., an 802.11x link, a USB link, an IEEE 1394 link etc.).

Example Method of Receiving and Providing Data

Figure 3:
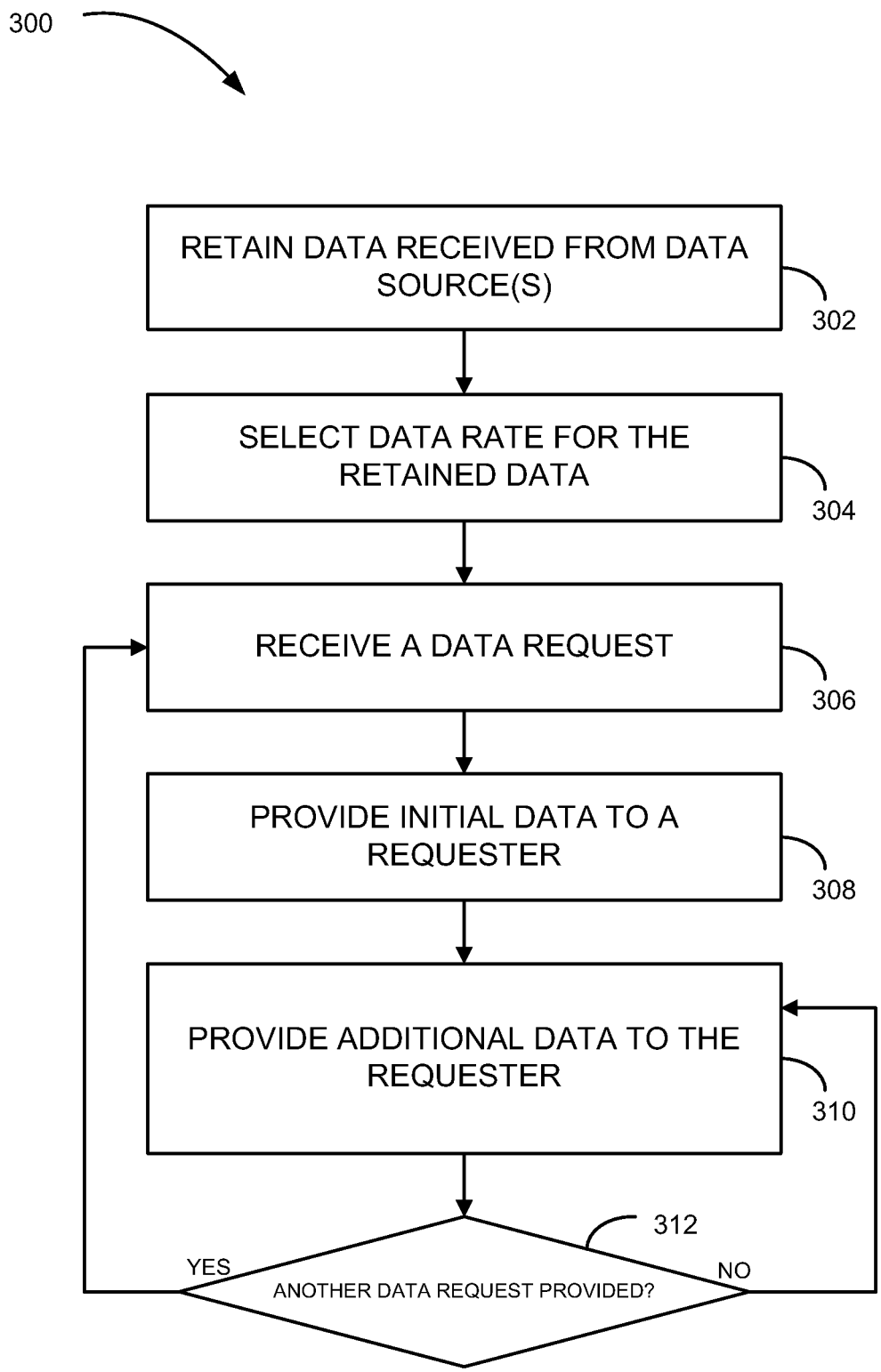
FIG. 3 is a flowchart illustrating a method, in accordance with an example embodiment, for providing data to a requester.

Referring to FIG. 3, a method 300 in accordance with an example embodiment for providing data to a requester is shown. In an example embodiment, the data may be a number of frames of video content from a television channel. The data may be hierarchical data (e.g., of a hierarchical data type) in which interpretation and/or use of future data depends on previous data. The method 300 may be deployed in the system 100 and the interactive television environment 200 (see FIGS. 1 and 2) and, accordingly, is described by way of example with reference thereto.

Data may be received from one or more data sources 102 and retained within a buffer of the switch/router 104, 229 (see FIGS. 1 and 2) at block 302. In an example embodiment, hierarchical data received from a data source may be retained in a buffer.

For example, data in the form of video content may be received via a multicast transmission protocol or a unicast transmission protocol from the data sources 102.

A data rate may be selected for the retained data at block 304. Selection of the data rate may be context sensitive. Thus, for example, the data rate may be calculated for audio content and/or video content (time sensitive content) but may not be calculated for web pages (which are less time sensitive). The data rate may be a fixed or a variable data rate. In an example embodiment, the data rate may be calculated. A fixed data rate may, for example, be selected for retained hierarchical data in the buffer.

A data request may be received by the switch/router 104, 229 at block 306. The data request may include a request for video content of a channel (e.g., a multicast join request).

In response to the data request, initial data may be provided from the switch/router 104, 229 to a requestor at block 308. In an example embodiment, the initial data may include an access point of a data set. The initial data may be the data starting from a first access point until a second access point. For example, the initial data may be a frame of video content designated as a GOP start marker and subsequent frames of the video content until another frame is designated with the GOP start marker. In an example embodiment, the initial data may include frames of the video content that can be used to decode subsequent frames in the data stream of the video content until a next access point is received. The initial data may include intermediate join data, buffered data, and/or delayed data. An example embodiment of providing initial data to the requester is described in greater detail below.

The initial data may include a first packet of an object being transmitted that may be designated as segment 0 (zero) and contain information regarding size and nature of the packetized object which may be first used to download and/or reconstructing the object.

The initial data may be provided at block 308 at the selected data rate selected at block 304 and additional data may be provided to the requester at block 310. The initial data may be provided in parallel to the additional data and, optionally, may be provided at a lower quality. For example, the additional data may be one or more frames of video content after the initial frames of video content are provided for the channel. The additional data may be provided at block 310 at the selected data rate.

In an example embodiment the operations of block 304 and block 306 may occur in parallel, such that the data rate need not be selected before receiving a data request.

At decision block 312, the method 300 may determine whether another new data request is being provided. If another data request is being provided, the method 300 may return to block 302. If the new data request is not being provided, the method 300 may return to block 310.

In an example embodiment for hierarchical (or sequential) data sets, the switch/router 104, 229 may start buffering with a first packet in a sequence or hierarchy as an access point in a data set. Depending on the type of data being processed, the access point may either be explicitly signaled to the switch/router 104, 229, or derived from the data itself through inspection. Whenever a new user joins a multicast of the hierarchical (or sequential) data, the switch/router 104, 229 may start outputting information from a last start packet of data rather than a last packet of data received. In the event that no packet start marker is found in the multicast buffer, the switch/router 104, 229 may pass data through by reverting to an unbuffered mode.

In an example embodiment, each device receiving the initial data at block 308 may receive the same initial data within a certain time period (e.g., before new initial data is contained within a buffer). For example, instead of each requesting device receiving the additional data and waiting until an access point is received before rendering the data, the devices may instead render data as soon as the initial data is received (e.g., by the switch/router 104, 229). The additional data provided at block 310 may then be received and/or processed by the device at a slight delay so that the data is provided continuously.

In an example embodiment, selecting the data rate at block 304 and providing data at the selected data rate at blocks 308, 310 may reduce data rate variations.

The assignment and management of buffers on the switch/router 104, 229 for various multicasts may be simplified by providing explicit signaling to the switch/router 104, 229. For example, configuration information may be sent to the router 104, 229 out of band using a remote management scheme to identify buffered multicasts and associate a particular buffer size. In an example embodiment, explicit marking of multicasts by information embedded in the multicast may be used to indicate properties such as stream priority and data set size.

Example Methods for Transmitting Data

Figure 4:
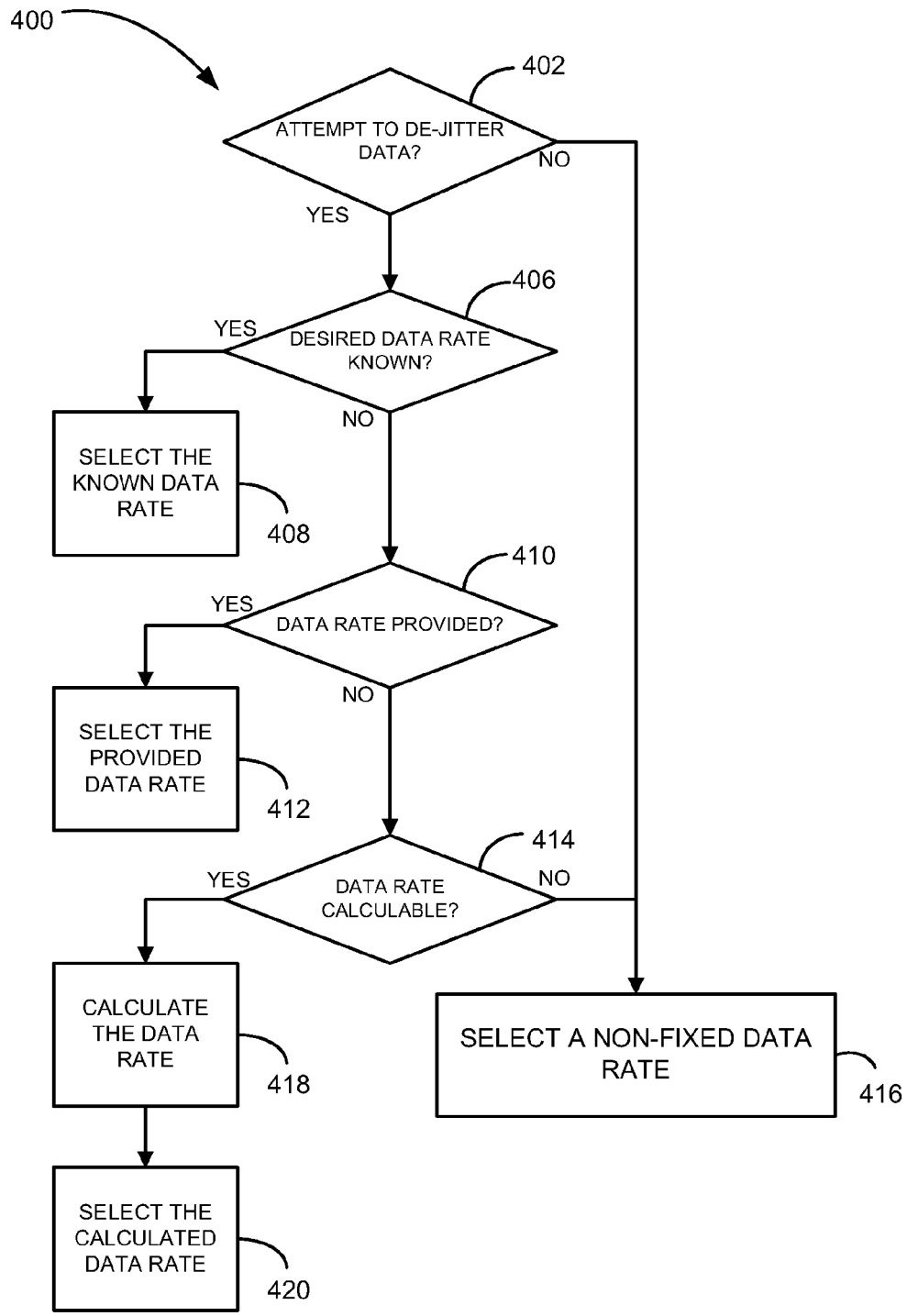
FIG. 4 is a flowchart illustrating a method, in accordance with an example embodiment, for selecting a data rate.

Referring to FIG. 4, a method 400 in accordance with an example embodiment for selecting a data rate is shown. In an example embodiment, the method 400 may be performed at block 306 of the method 300 (see FIG. 3) and may operate on the switch/router 104, 229 (see FIGS. 1 and 2).

A determination may be made at decision block 402 as to whether an attempt to de-jitter the data should be made (e.g., by stabilizing a data rate at which the data may be provided). In an example embodiment, the data may be a frame of video content and the data rate may be a frame rate of video content.

If no attempt is made to de-jitter the data at decision block 402, the method 400 may proceed to select a non-fixed rate for the data as the selected rate (see block 416). For example, the non-fixed rate may be the rate at which the switch/router 104, 229 receives the data. If the method 400 attempts to de-jitter the data at decision block 402, the method 400 may proceed to decision block 406.

The method 400 may determine at decision block 406 whether the date rate for the data is known. If the data rate is known, the method 400 may select a known data rate as the selected data rate at block 408. For example, the data rate may be known when the switch/router 104, 229 is accessing content from a known content source. If the desired date rate is not known at decision block 406, the method 400 may proceed to decision block 410.

At decision block 410, the method 400 may determine whether the data rate has been provided. If the data rate has been provided, the method 400 may select a provided data rate as the selected data rate at block 412.

In an example embodiment, the provided data rate may be received from external signaling. The provided data rate may be embedded within a data stream using, for example, a data tag. If the data rate has not been provided at decision block 410, the method 400 may proceed to decision block 414.

The method 400 may determine at decision block 414 whether the data rate can be calculated. If the data rate can be calculated, the method 400 may calculate the data rate at block 418 and select the calculated data rate as the selected data rate at block 420. For example, the method 400 may calculate the data rate by analyzing an average data rate for a data stream. If the data rate cannot be calculated at decision block 414, the method 400 may proceed to block 416. Dependent upon the outcome at decision blocks 402, 406, 410, and 414 the method 400 may terminate after blocks 416, 408, 412, 416 or block 420 respectively.

Figure 5:
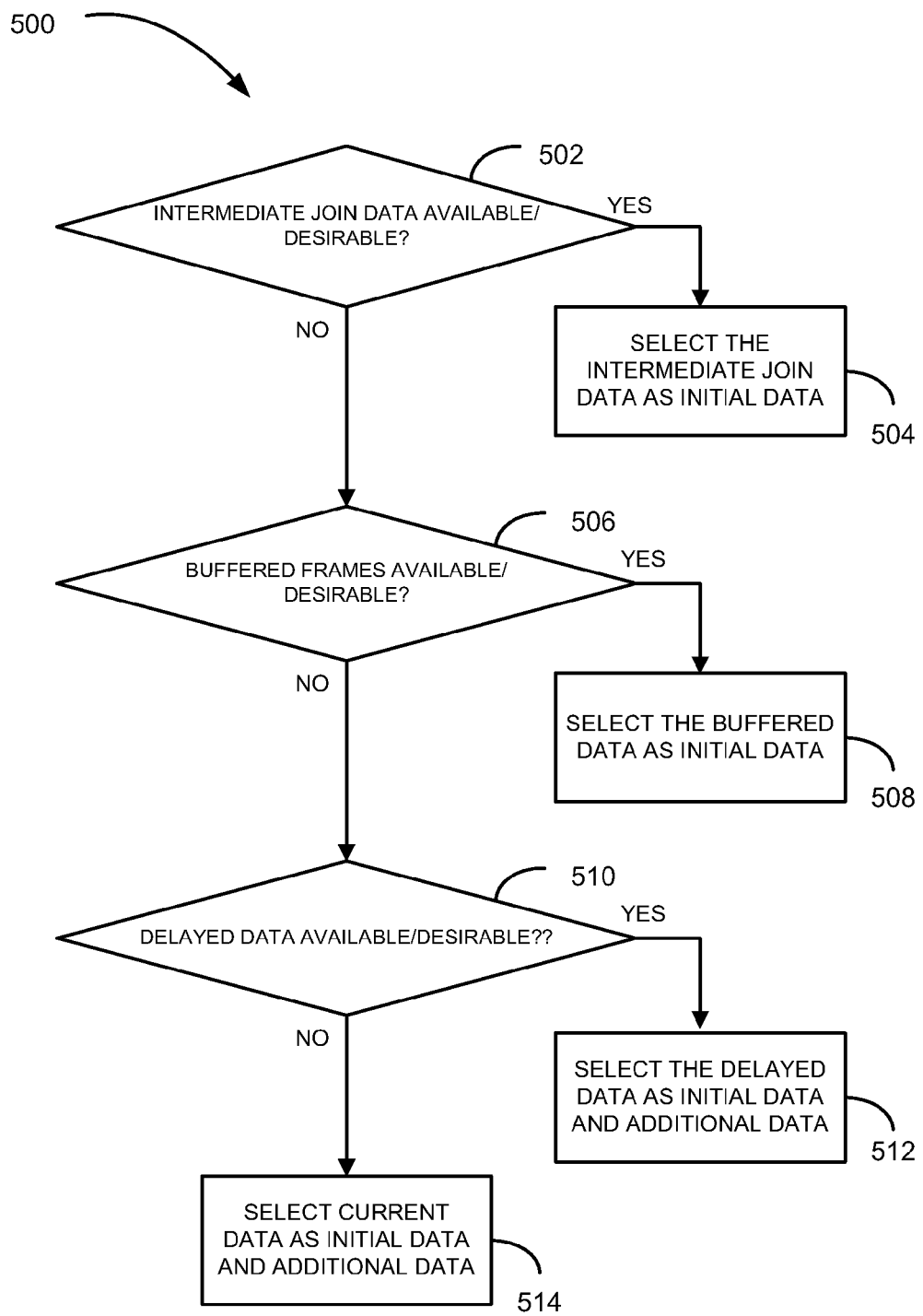
FIG. 5 is a flowchart illustrating a method, in accordance with an example embodiment, for selecting initial data.

Referring to FIG. 5, a method 500 in accordance with an example embodiment for selecting initial data is shown. In an example embodiment, the initial data at block 308 (see FIG. 3) may be selected utilizing the method 500.

The method 500 may determine whether a selection of intermediate join data as the initial data is available and/or desirable at decision block 502. The intermediate join data may act as a synthesized access point to enable access to additional hierarchical data without first receiving an access point of the additional hierarchical data. For example, the access points may provide anchors that reset an interpretation process and initialize an internal state of an interpreter of the hierarchical data. The intermediate join data may be in the form of one or more intermediate join frames that may be retained for use on the switch/router 104, 229 (see FIGS. 1 and 2).

If the intermediate join data is available and/or desirable, the method 500 may select the intermediate join data as the initial data at block 504 so that it may be provided at block 308. Example embodiments for selecting intermediate join data to enable the intermediate join of a data set is described in greater detail below. If the intermediate join data is not available and/or desirable at decision block 502, the method 500 may proceed to decision block 506.

In an example embodiment, the intermediate join data may be desirable when there is bandwidth to send the intermediate join data to the switch/router 104, 229 hooked to a core network, but not enough bandwidth to send the intermediate join data along to a receiver. In an example embodiment in the interactive television environment 200 (see FIG. 2), the intermediate join data may be sent at a lower quality to enable a faster channel change.

At decision block 506, the method 500 may determine whether a selection of buffered data as the initial data is available and/or desirable. If the buffered data is available and/or desirable, the method 500 may select the buffered data as the initial data at block 508. An example embodiment for selecting the buffered data is described in greater detail below. If the buffered data is not available and/or desirable for use as the initial data at decision block 506, the method 500 may proceed to decision block 510.

The method 500 may determine whether a selection of delayed data as the initial data is available and/or desirable at decision block 510. In an example embodiment, the delayed data may be available when a buffer does not retain all data received from a particular program or object and a delayed transmission of the data is available.

If the delayed data is available and/or desirable at decision block 510, the method 500 may select the delayed data as the initial data and the additional data at block 512. For example, the delayed data may include sending data at a delay. If the delayed data is not available and/or desirable at decision block 510, the method 500 may select current data as the initial data and the additional data at block 514.

After the operations at block 504, block 508, block 512, or block 514 are complete, the method 500 may terminate.

Figure 6:
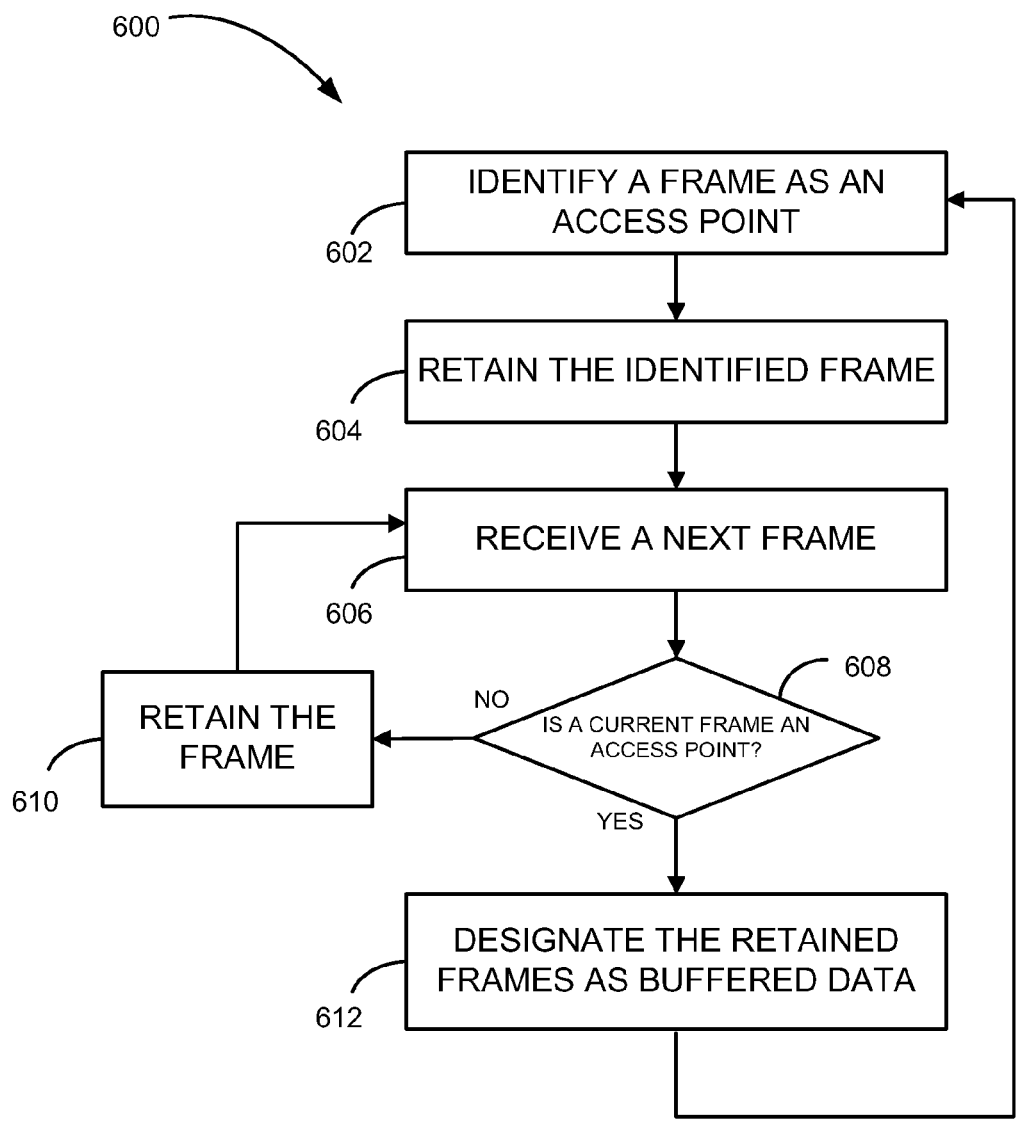
FIG. 6 is a flowchart illustrating a method, in accordance with an example embodiment, for selecting buffered data as initial data.

Referring to FIG. 6, a method 600 in accordance with an example embodiment for selecting buffered data as initial data is shown. In an example embodiment, the method 600 may be performed at block 508 (see FIG. 5). In an example embodiment, the buffered data selected as the initial data may be used during the operations at block 308 (see FIG. 3).

A frame may be identified as an access point in a data set at block 602. In an example embodiment, a first data unit (e.g., a frame) may be identified as a first access point from among a number of data units (e.g., a number of frames). For example, the first data unit may be of a hierarchical data type. In an example embodiment, the data units may be hierarchical data units, such that interpretation and/or use of use of future data units depend on previous data units. Example embodiments of identifying the access point in the data set are described in greater detail below.

The identified frame may be retained as a starting point at block 604. For example, the identified frame may be retained in a buffer of the switch/router 104, 229 (see FIGS. 1 and 2).

A next frame may be received as a current frame at block 606. For example, the next frame in a number of frames (e.g., a data stream of frames of video content) of a channel may be received by the switch/router 104, 229.

The method 600 may determine whether a current frame is another access point (e.g., a second access point) at decision block 608. If the current frame is not an access point, the current frame may be retained (e.g., in a buffer) at block 610 and the method 600 may return to block 606. If the frame is an access point at decision block 608, the starting point and the retained frames may be designated as buffered data at block 612 and the method 600 may return to block 602. For example, the buffer data may be further designated as the initial data at block 508 (see FIG. 5) and/or may be provided to the requester as the initial data at block 308 (see FIG. 3).

In an example embodiment, the frame identified as the access point at block 602 upon the start of method 600 may be identified as a first access point and the frame identified as the access point after the decision block 608 at block 602 may be identified as the second access point. In an example embodiment, frames before the starting point may be discarded from the buffer.

Figure 7:
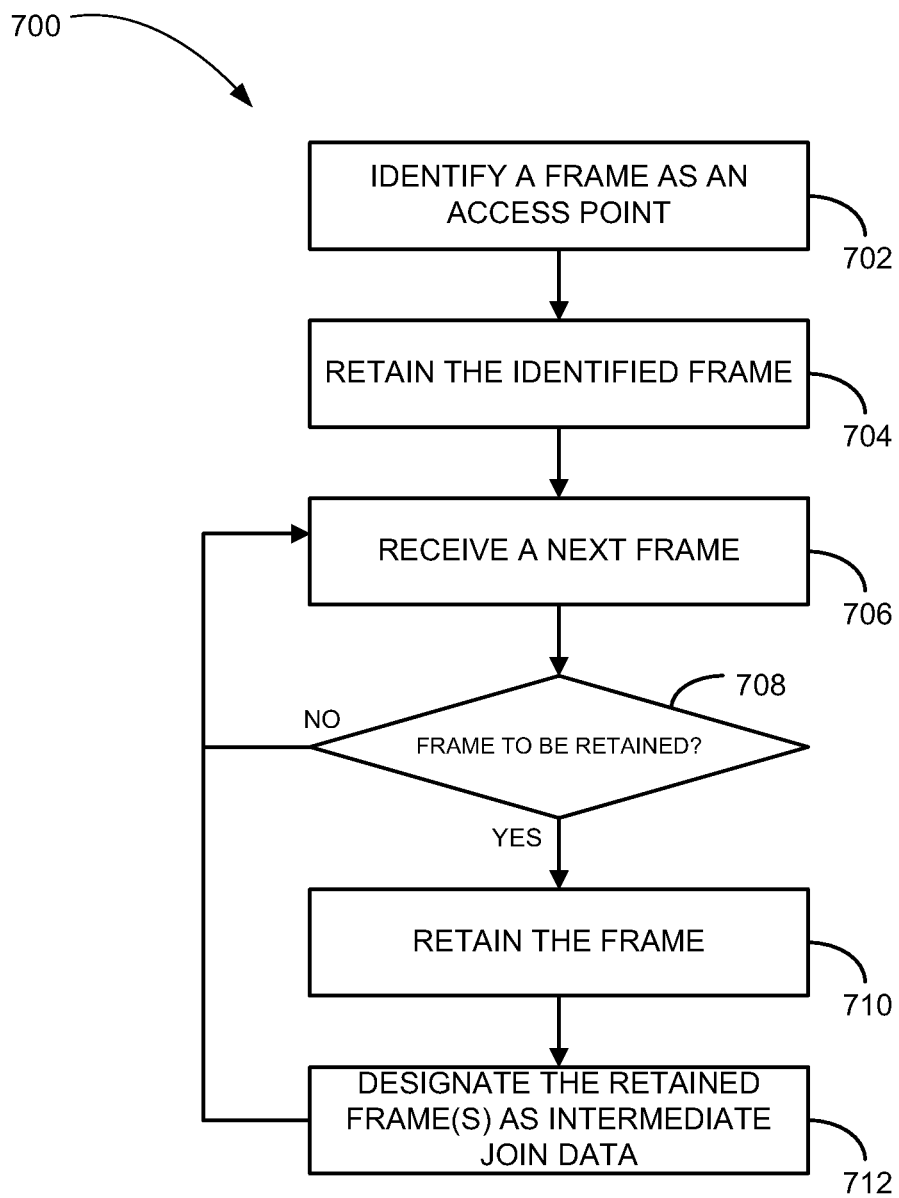
FIG. 7 is a flowchart illustrating a method, in accordance with an example embodiment, for selecting intermediate join data as initial data.

Referring to FIG. 7, a method 700 in accordance with an example embodiment for selecting intermediate join data as initial data is shown. In an example embodiment, the method 700 may be performed at the block 504 (see FIG. 5). In an example embodiment, the intermediate join data selected as the initial data may be used during the operations at block 308 (see FIG. 3).

A frame may be identified as an access point at block 702. In an example embodiment, the operations of block 602 (see FIG. 6) may be performed at block 702. An example embodiment of identifying a frame as an access point is described in greater detail below.

The identified frame may be retained at block 704. For example, the identified frame may be retained in a buffer of the switch/router 104, 229 (see FIGS. 1 and 2). In an example embodiment, a first data unit may be identified at block 702 and retained as an access point among a number of data units at block 704.

A next frame may be received at block 706. For example, the next frame in a number of frames (e.g., a data stream of frames of video content) of a channel may be received by the switch/router 104, 229.

At decision block 708, a determination may be made as to whether the received frame should be retained. For example, the received frame may be retained when the frame may be used to decode a remaining portion of the number of frames of the channel until a next access point is received. If the received frame is not to be retained, the method 700 may return to block 706. If the received frame is to be retained at decision block 708, the method 700 may proceed to block 710.

The received frame may be retained (e.g., in a buffer) at block 710. Each of the received frames that have been retained at block 710 may be designated as the intermediate join data at block 712. For example, the intermediate join data may be further designated as the initial data at block 504 (see FIG. 5) and/or may be provided to the requester as the initial data at block 308 (see FIG. 3). After completing the operations at block 712, the method 700 may return to block 706.

In an example embodiment, after all retained frames have been designated as intermediate join data at block 712, the method 700 may terminate.

After the completion of the operation at block 712, retained data units (e.g., the received frames that have been retained) may be provided in response to a request (e.g., a channel change request) when a current data unit (e.g., a current frame) of the number of data units (e.g., the frames of video content) is not an access point.

In an example embodiment, one or more additional data units of a number of data units after an access point may be identified at block 710 and retained at block 712, the retained data units being to decode the number of data units after the access point until a next access point. The retained data units may then be provided in response to a request (see block 308 of FIG. 3) when a current data unit of the number of data units is not an access point.

Figure 8:
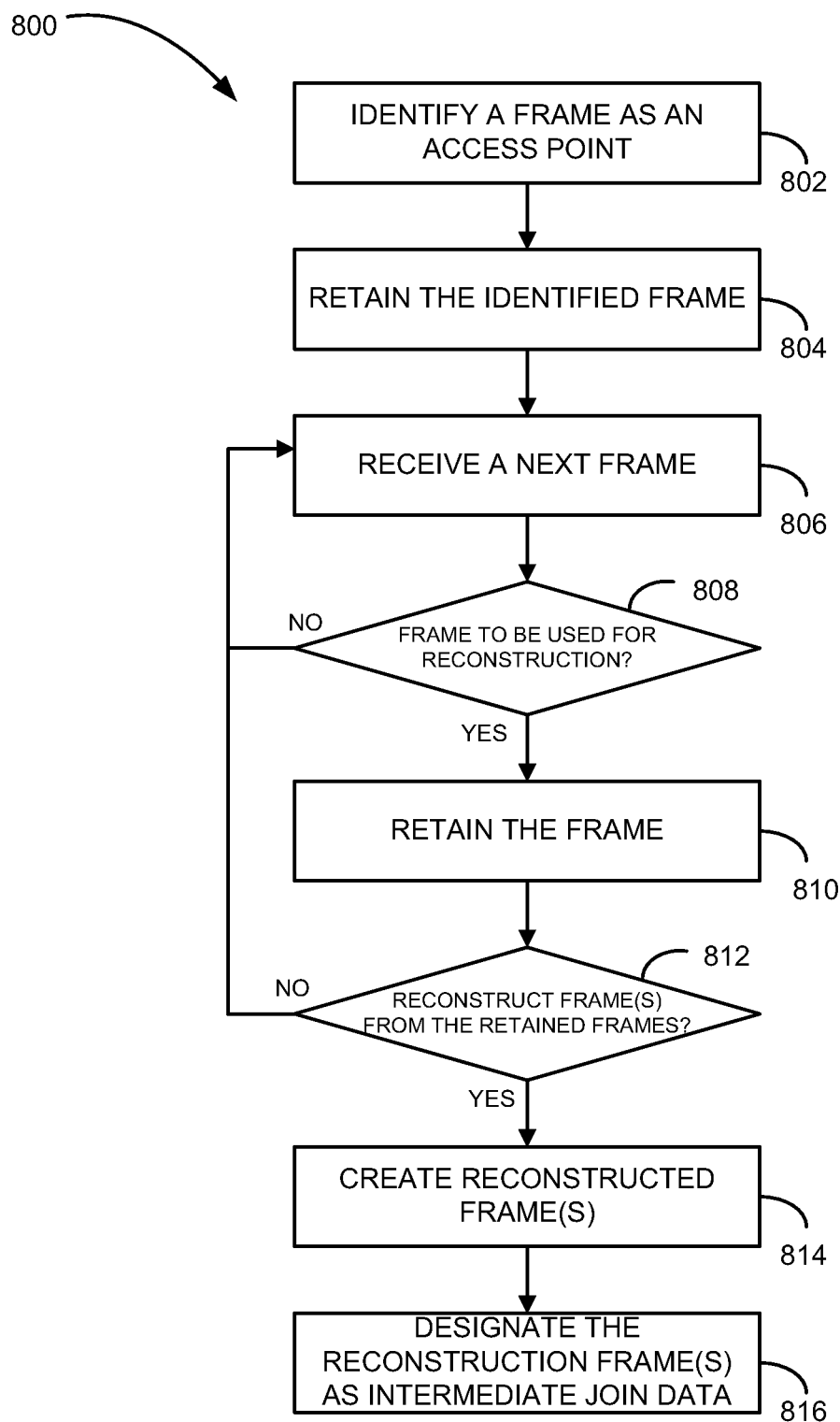
FIG. 8 is a flowchart illustrating a method, in accordance with an example embodiment, selecting intermediate join data as initial data.

Referring to FIG. 8, a method 800 in accordance with an example embodiment for selecting intermediate join data as initial data is shown. In an example embodiment, method 800 may be performed at block 504 (see FIG. 5). In an example embodiment, the intermediate join data selected as the initial data may be used during the operations at block 308 (see FIG. 3).

A frame may be identified as an access point at block 802. In an example embodiment, the operations of block 702 (see FIG. 7) may be performed at block 802. An example embodiment of identifying data (e.g., a frame) as an access point is described in greater detail below.

The identified frame may be retained at block 804. In an example embodiment, the operations of block 704 (see FIG. 7) may be performed at block 804. For example, a first data unit may be identified at block 802 and retained at block 802 as an access point among a plurality of data units.

A next frame may be received at block 806. For example, the next frame in a number of frames (e.g., a data stream of frames of video content) of a channel may be received by the switch/router 104, 229.

At decision block 808, a determination may be made as to whether the received frame may be used for reconstruction (e.g., reconstructing subsequent data). For example, the received frame may be used for reconstruction when the received frame may be used to decode other frames, which may include a data stream of video content.

If the received frame will not be used for reconstruction, the method 800 may return to block 806. If the received frame will be used for reconstruction, the method 800 may retain the received frame at block 810 and proceed to decision block 812.

At decision block 812, the method 800 may determine whether to create reconstruction frames from the retained frames. If the reconstruction frames are not to be created, the method 800 may return to block 806. If the reconstruction frames are to be created, the reconstructed frames may be created at block 814 and the reconstruction frames may be designated as intermediate join data at block 816. For example, the reconstructed frames may be created by reconstructing and re-encoding one or more frames from other frames in the buffer, such that the reconstructed frames may be used to decode other frames. In an example embodiment, the reconstructed frames may be marked as reconstructed frames at block 814.

In an example embodiment, the frames of which the replacement frames are replacing may be discarded from the buffer at block 814.

The reconstruction frames may be created at a same bit rate as the retained frames. However, in other embodiments the reconstructed frames may be created at a different bit rate (e.g., a lower bit rate) as the retained frames. After block 816, the method 800 may terminate.

After completing the operations at block 816, a first data unit (e.g., a first frame) and reconstructed data units (e.g., the reconstructed frames) may be provided in response to a request (e.g., a channel change request) when a current data unit (e.g., a current frame) of the number of data units is not an access point. For example, the intermediate join data may be further designated as the initial data at block 504 (see FIG. 5) and/or may be provided to the requester as the initial data at block 308 (see FIG. 3).

While the methods 600, 700, 800 (see FIGS. 6-8) refer to data in the form of frames, it should be appreciated that the methods 600, 700, 800 may be used with other types of data such as hierarchical data.

Figure 9:
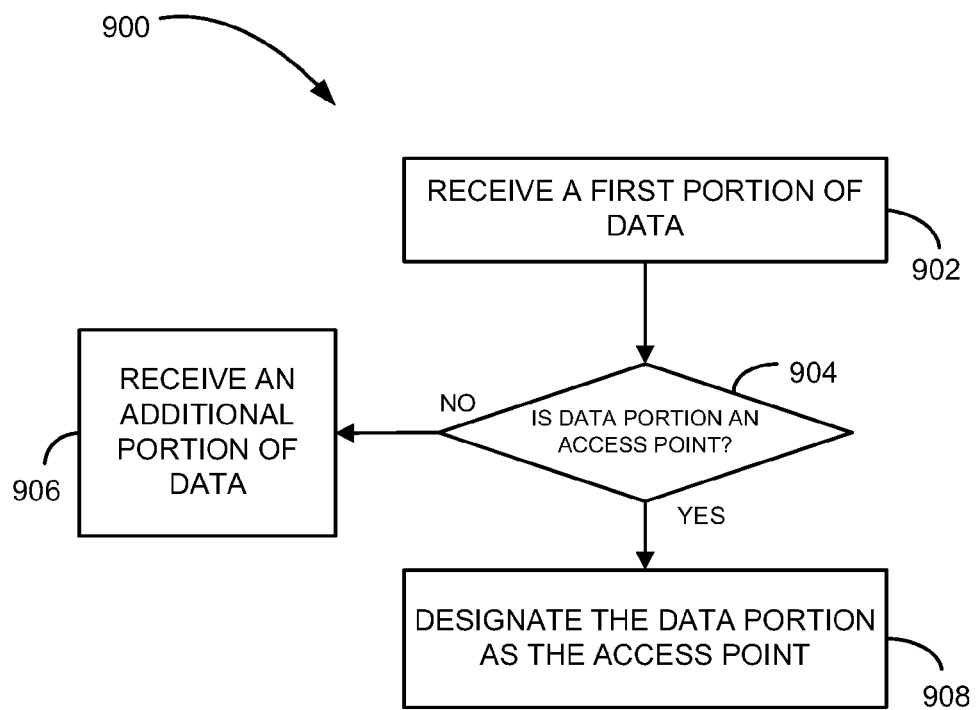
FIG. 9 is a flowchart illustrating a method, in accordance with an example embodiment, for identifying data as an access point.

Referring to FIG. 9, a method 900 in accordance with an example embodiment for identifying data as an access point is shown. In an example embodiment, the method 900 may be performed at block 602 (see FIG. 6), at block 702 (see FIG. 7), and/or at block 802 (see FIG. 8).

A first portion of data (e.g., a data unit such as a frame and/or a data packet) may be received at block 902. For example, the first portion of data may be received by the switch/router 104, 229 from the data source 102 and/or headend system 218 (see FIGS. 1 and 2).

At decision block 904, a determination may be made as to whether the received data is an access point. In an example embodiment, the received data may be an access point when the received data is a key frame that can be decoded without reference to other frames. In an example embodiment, the access point may be a starting element of a data stream to be processed before a remaining portion of the data stream. In an example embodiment, the access point may be a top element of a data set (e.g., a directory file) to be processed before a remaining portion of the data set (e.g., files within the directory identified by the directory file) can be processed to enable access to the remaining portion of the data set. In an example embodiment, the access point may be a GOP (group of pictures) start marker. The access point may however be a key frame of video content, such that the key frame may be decoded without reference to other frames of the video content. Other access points may also be provided.

In an example embodiment, the identification of the portion of data as an access point may include an indication in the data of a frame. For example, such an indication may be provided when the frame is part of MPEG-2 data or MPEG-4 data. The identification of the portion of data as an access point may be based on transmission of the data as a first part of a collection of data sections where a data stream carrying the data may include information that indicates a type and start of each data section. The identification of the portion of data as an access point may be signaled through a time code. In an example embodiment, the identification of the portion of data as an access point may be signaled through metadata.

If the received data is not an access point, an additional portion of data may be received at block 906 and the method 900 may return to decision block 904. If the received portion of data is an access point at decision block 904, the method 900 may designate the received portion of data as an access point at block 908. After block 908, the method 900 may terminate.

Example Methods for Using Transmitted Data

Figure 10:
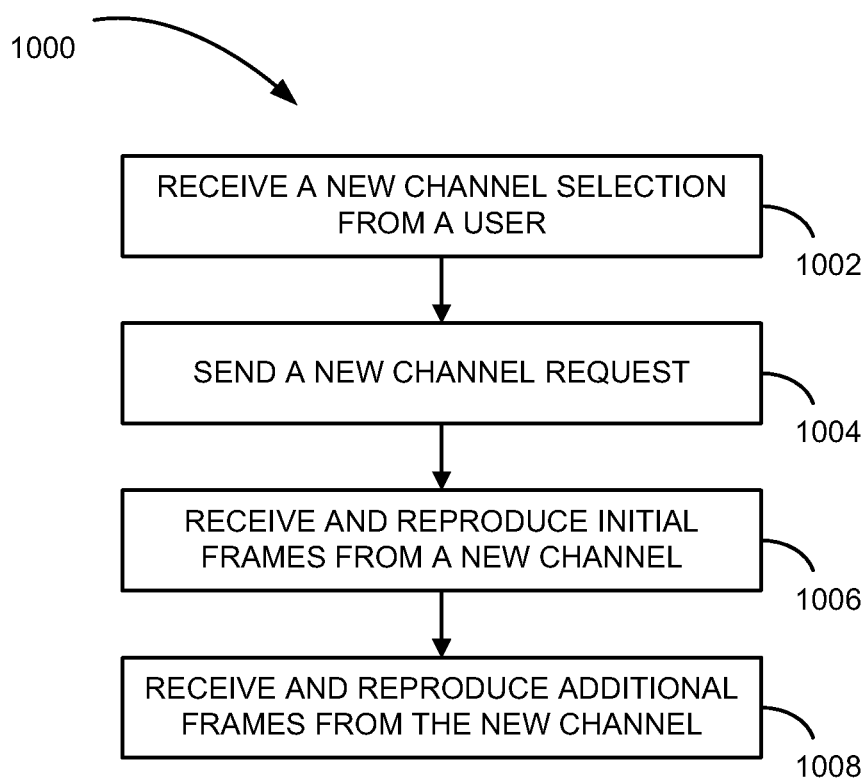
FIG. 10 is a flowchart illustrating a method, in accordance with an example embodiment, for receiving a channel.

Referring to FIG. 10, a method 1000 in accordance with an example embodiment for receiving a channel is shown. In an example embodiment, the method 1000 may operate on the intermediate device 108.1, 108.2 (see FIG. 1), and/or on the set-top box 238 (see FIG. 2).

A new channel selection may be received from a user at block 1002. A new channel request may be sent at block 1004. For example, the intermediate device 108.1, 108.2 and/or the STB 238 may send a multicast join to the switch/router 104, 229.

The initial frames of the new channel may be received and reproduced at block 1006 by the intermediate device 108.1. For example, reproducing the initial frames may include decoding and presenting the initial data.

Additional frames of the new channel may be received and reproduced at block 1008. For example, reproducing the additional frames may include decoding and presenting the additional data. After completion of block 1008, the method 1000 may terminate.

Figure 11:
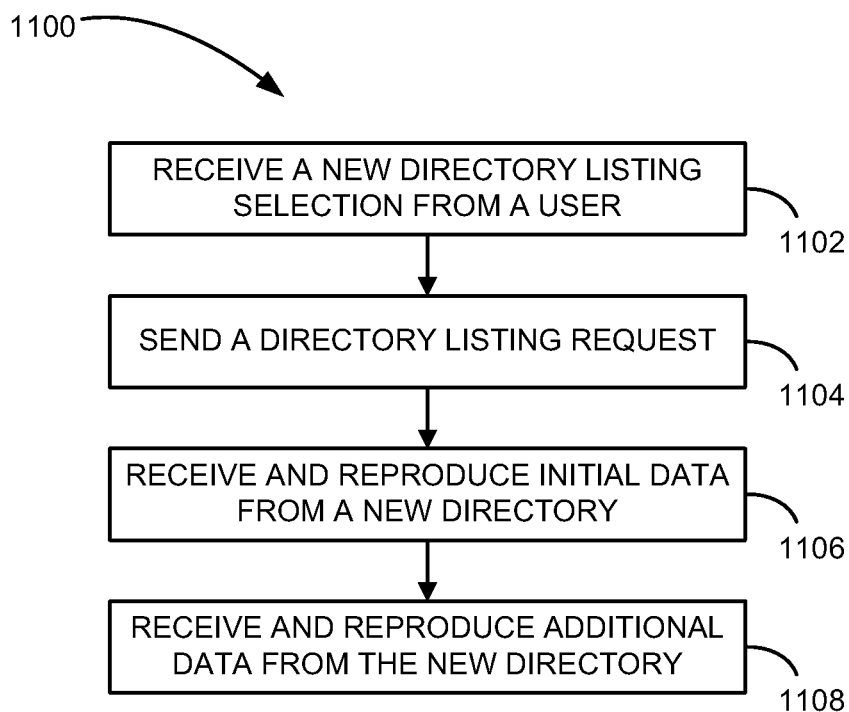
FIG. 11 is a flowchart illustrating a method, in accordance with an example embodiment, for receiving a directory.

Referring to FIG. 11, a method 1100 in accordance with an example embodiment for receiving a directory is shown. The directory may be a directory tree containing code and/or order data. In an example embodiment, the directory may be an electronic program guide (EPG) on an intermediate device 108.1, 108.2 of the system 100 and/or the set-top box 238 of the interactive television environment 200.

A new directory listing selection may be received from a user at block 1102. A directory listing request may be sent at block 1104.

Initial data for a new directory may be received at reproduced at block 1106. Additional data for the new directory may be received at reproduced at block 1108. After block 1108, the method 1100 may terminate.

Example Method for Encoding Video Content

Figure 12:
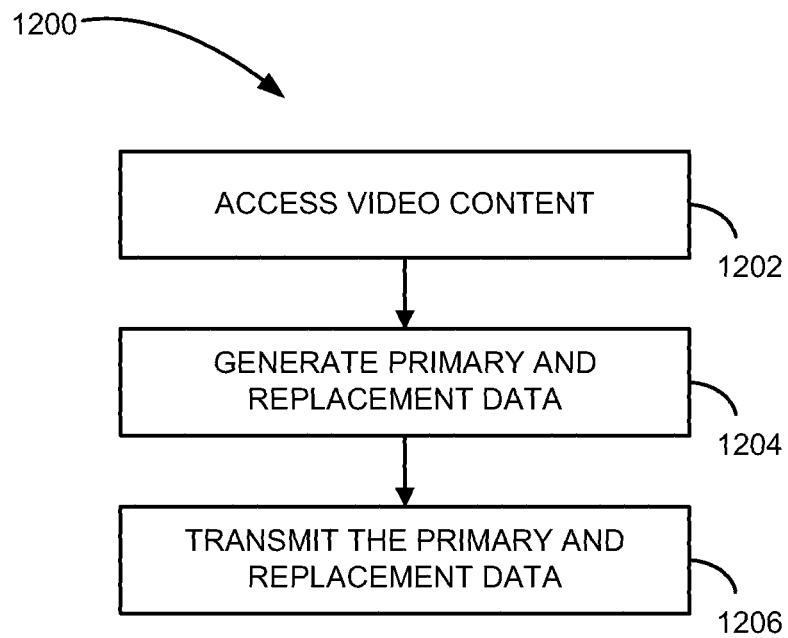
FIG. 12 is a flowchart illustrated a method, in accordance with an example embodiment, for encoding video content.

Referring to FIG. 12, a method 1200 for encoding video content is shown. The video content may be accessed at block 1202. Primary data and replacement data may be generated at block 1204. In an example embodiment, the primary data may be data ordinarily sent without additional access points and the replacement data may include initial data and, optionally, additional data that provides additional access points.

The primary data and replacement data may be transmitted at block 1206. In an example embodiment, the primary data and replacement data may be sent from the data source 102 and/or the headend system 218 to the switch/router 104, 229 (see FIGS. 1 and 2). After completion of block 1206, the method 1200 may terminate.

Example Retained Data as Frames

Figure 13:
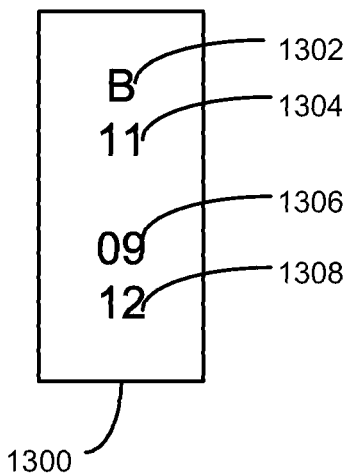
FIG. 13 is a schematic representation of a frame in accordance with an example embodiment.

Referring to FIG. 13, a frame 1300 in accordance with an example embodiment is shown. The frame 1300 may be part of the initial data and/or additional data and is shown to include by way of example a frame type 1302, a presentation frame number 1304, and a frame dependency 1306, 1308.

The frame type 1302 may indicate a type of the frame 1300. For example, an "I" frame may be a standalone frame, a "P" frame may depend on previous "I" frames and/or "P" frames, a "B" frame (as shown by way of example in FIG. 13) may depend on surrounding "I" and/or "P" frames, and a "BR" frame may be used as references for other "B" frames. In an example embodiment, where frames are reconstructed from previously received frames on a device (e.g., the switch/router 104, 229), an "RI" indicator may be used to indicate a reconstructed and re-encoded I frame. Likewise, an "RP" indicator may be used to indicate a reconstructed and re-encoded P frame. Thus, in an example embodiment, reconstructed frames may be identified using the prefix "R" followed by the particular frame type (e.g., I, P, and B). For example, P frames may be predicted frames based on previous frames in a data stream, B frames may be bidirectional frames based on a preceding P frame and a succeeding P frame.

The presentation frame number 1304 may indicate an order in which a series of frames are presented to a user. The frame dependency 1306, 1308 may indicate other frames on which the frame depends.

Figure 14:
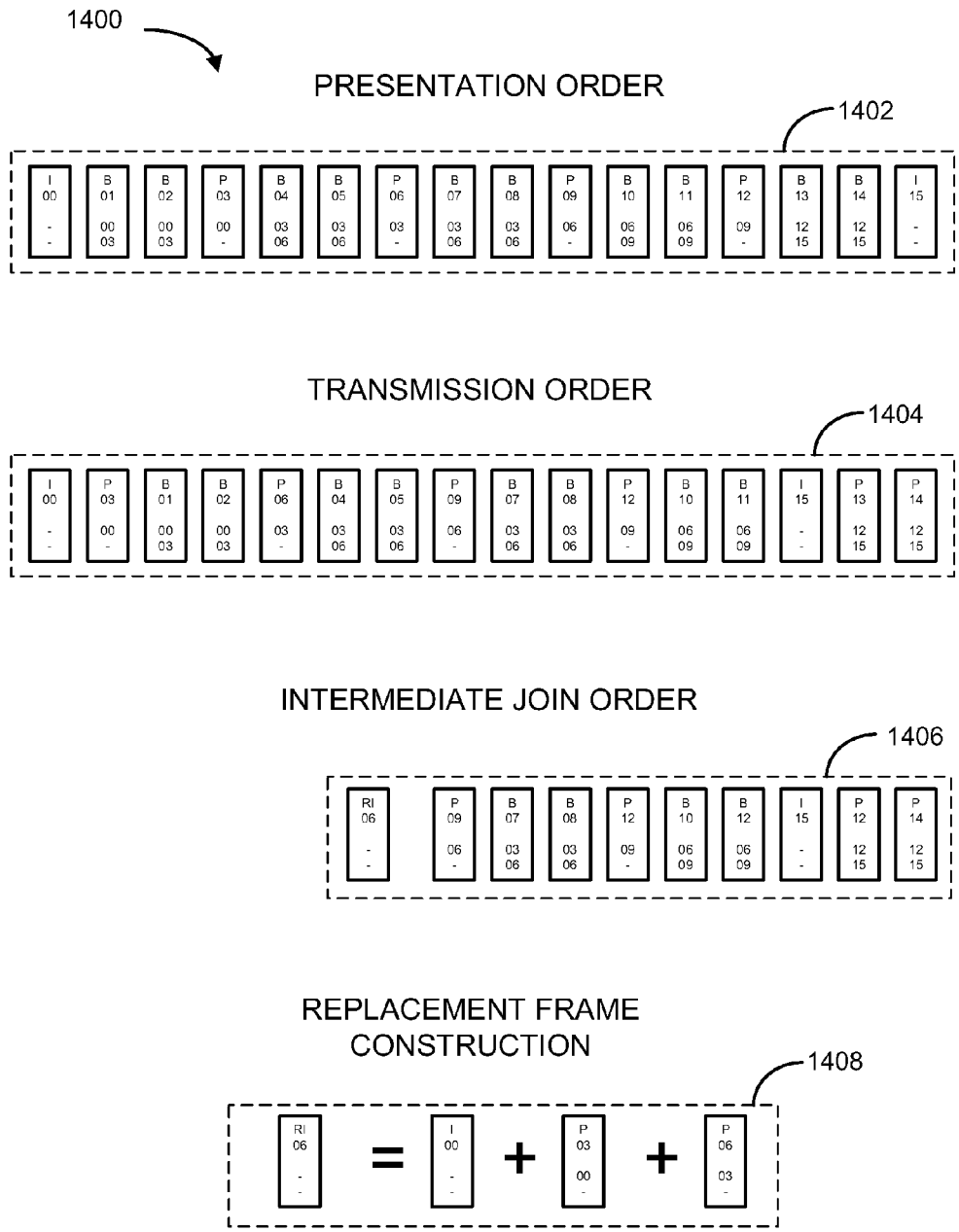
FIGS. 14-17 are schematic representations of a series of frames in accordance with example embodiments.

Referring to FIG. 14, a series of frames 1400 in accordance with an example embodiment is shown. The series of frames 1400 may, for example, be based on an MPEG-2 structure.

A presentation order 1402 may indicate an order in which the series of frames 1400 are presented to a viewer. In an example embodiment as illustrated, the presentation order 1402 may be an I frame 00, a B frame 01, a B frame 02, a P frame 03, a B frame 04, a B frame 05, a P frame 06, a B frame 07, a B frame 08, a P frame 09, a B frame 10, a B frame 11, a P frame 12, a B frame 13, a B frame 14 and an I frame 15.

A transmission order 1404 shows an example of an order in which the series of frames 1400 may be received by a device. The device may, for example, be one of the intermediate devices 108.1, 108.2 (see FIG. 2), the switch/router 229 (see FIG. 2), or any other network device. The transmission order 1404 is shown merely by way of example to be may be an I frame 00, a P frame 03, a B frame 01, a B frame 02, a P frame 06, a B frame 04, a B frame 05, a P frame 09, a B frame 07, a B frame 08, a P frame 12, a B frame 10, a B frame 11, an I frame 15, a B frame 13 and a B frame 14.

An intermediate join order 1406 may include one or more reconstructed frames followed by a number of frames from the transmission order. For example, the intermediate join order 1406 may be a RI frame 06, a P frame 09, a B frame 07, a B frame 08, a P frame 12, a B frame 10, a B frame 11, an I frame 15, a B frame 13 and a B frame 14.

As illustrated, a replacement frame construction 1408 may include a RI frame 06 constructed from an I frame 00 and applying information from a P frame 03 and a P frame 06.

In an example embodiment, one or more replacement frames (e.g., RI frame 06) may be used to initialize the decoder's reference buffers in between GOP starts. The replacement frames may be sent ahead of a convenient position in the actual bit stream to permit decoding to start between original access points. The replacement frames may provide a new access point, effectively dividing a larger data set into a series of smaller data sets. Once the replacement frames have been received, frame data preceding the replacement frame data in the buffer may be discarded.

Figure 15:
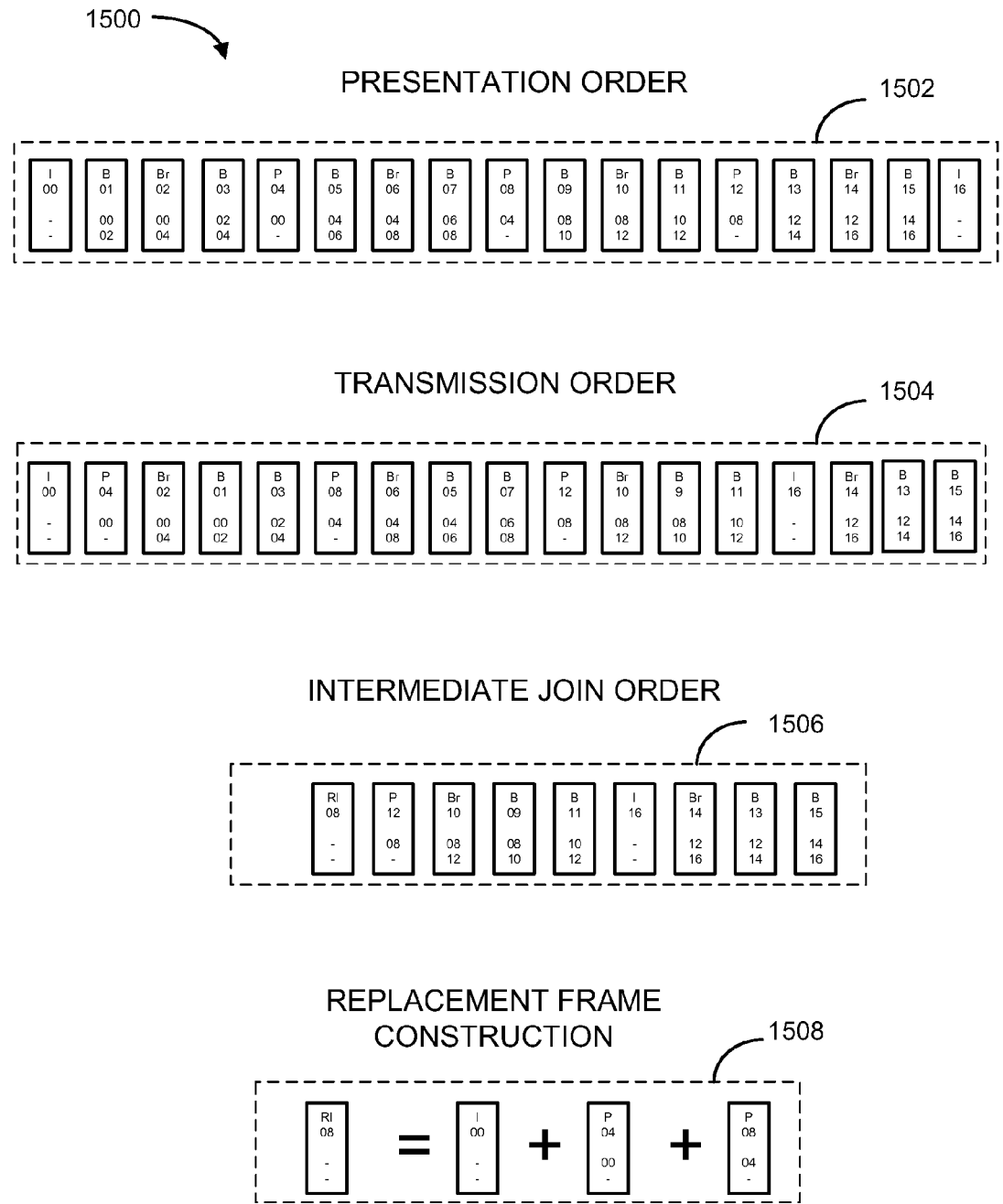

Referring to FIG. 15, a series of frames 1500 in accordance with an example embodiment is shown. In an example embodiment, the series of frames 1500 may represent an application of reference B frames of H.264 format, where the B frames may be used by other B frames during reconstruction. A single replacement frame may be used if the replacement frame is inserted prior to P frames.

A presentation order 1502 may indicate an order in which the series of frames 1500 are presented to a viewer. In an example embodiment as illustrated, the presentation order 1502 may be an I frame 00, a B frame 01, a Br frame 02, a B frame 03, a P frame 04, a B frame 05, a Br frame 06, a B frame 07, a P frame 08, a B frame 09, a Br frame 10, a B frame 11, a P frame 11, a B frame 13, a Br frame 14, a B frame 15, and an I frame 16.

A transmission order 1504 indicates an example order in which the series of frames 1500 may be received by a device. The device may be the intermediate device 108.1, 108.2 (see FIG. 2), the switch/router 229 (see FIG. 2), or any other network device. The transmission order 1504 is shown by way of example to be an I frame 00, a P frame 04, a Br frame 02, a B frame 01, a B frame 03, a P frame 08, a Br frame 06, a B frame 05, a B frame 07, a P frame 12, a Br frame 10, a B frame 9, a B frame 11, an I frame 16, a Br frame 14, a B frame 13 and a B frame 15.

An intermediate join order 1506 may include one or more reconstructed frames followed by a number of frames from the transmission order. The intermediate join order 1506 is shown by way of example to include a RI frame 08, a P frame 12, a Br frame 10, a B frame 09, a B frame 11, an I frame 16, a Br frame 14, a B frame 13, and a B frame 15.

As illustrated, a replacement frame construction 1508 may include a RI frame 08 constructed from an I frame 00 and applying information from a P frame 04 and a P frame 08.

Figure 16:
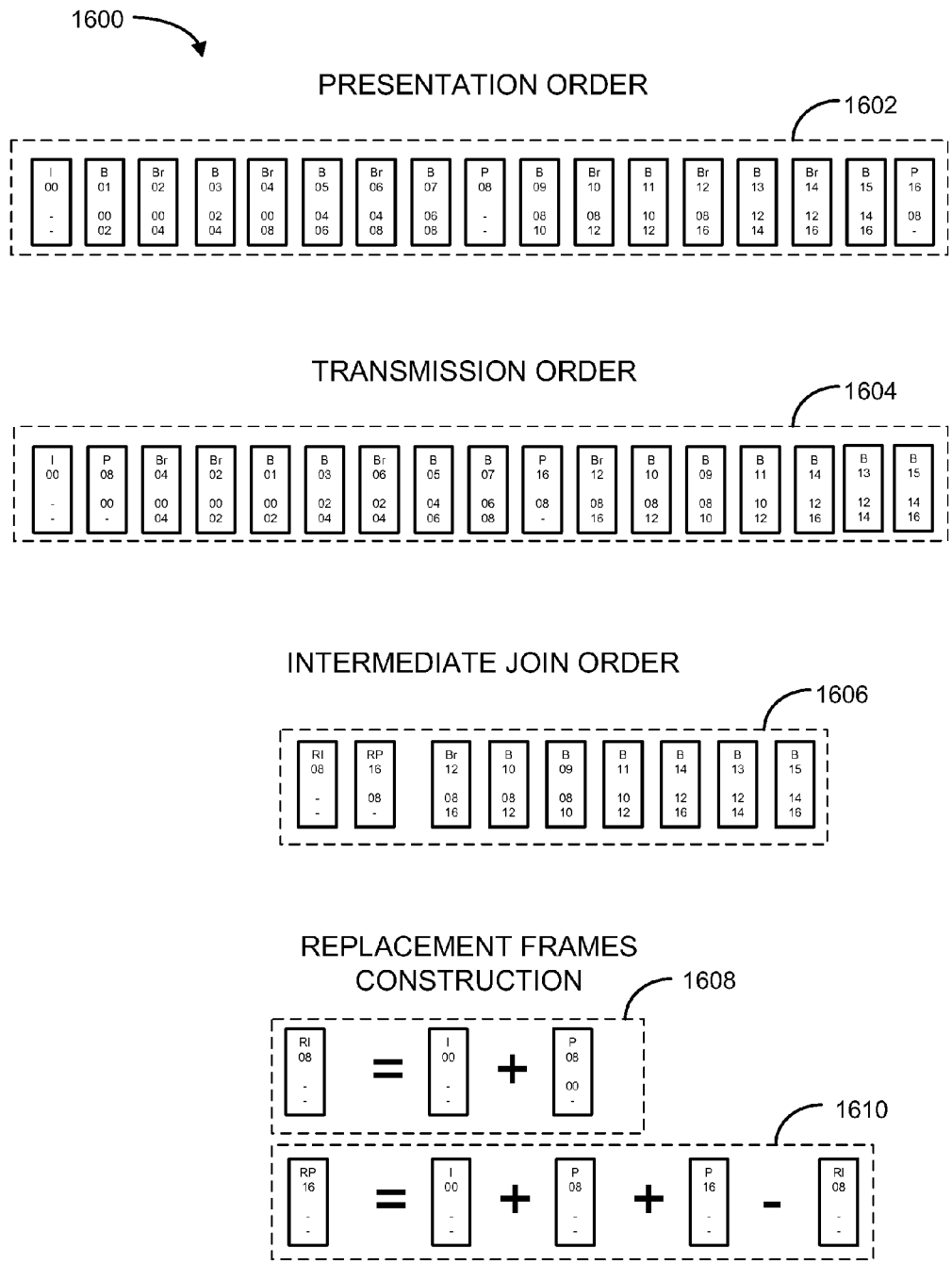

Referring to FIG. 16, a series of frames 1600 in accordance with an example embodiment is shown. The series of frames 1600 may, for example, use two levels of B reference frames.

A presentation order 1602 may indicate an order in which the series of frames 1600 are presented to a viewer. The presentation order 1602 is shown by way of example to be an I frame 00, a B frame 01, a Br frame 02, a B frame 03, a Br frame 04, a B frame 05, a Br frame 06, a B frame 07, a P frame 08, a B frame 09, a Br frame 10, a B frame 11, a Br frame 12, a B frame 13, a Br frame 14, a B frame 15 and a P frame 16.

A transmission order 1604 shows an example order in which the series of frames 1600 may be received by a device. The device may be one of the intermediate device 108.1, 108.2 (see FIG. 2), the switch/router 229 (see FIG. 2), or any other network device. The transmission order 1604 is shown by way of example to be an I frame 00, a P frame 08, a Br frame 04, a Br frame 02, a B frame 01, a B frame 03, a Br frame 06, a B frame 05, a B frame 07, a P frame 16, a Br frame 12, a B frame 10, a B frame 09, a B frame 11, a Br frame 14, a B frame 13, and a B frame 15.

An intermediate join order 1606 may include one or more reconstructed frames followed by a number of frames from the transmission order. The intermediate join order 1606 is shown to include a RI frame 08, a RP frame 16, a Br frame 12, a B frame 10, a B frame 09, a B frame 11, a B frame 14, a B frame 13 and a B frame 15.

As illustrated, a first replacement frame construction 1608 may include a RI frame 08 constructed from an I frame 00 and applying information from a P frame 08 and a second replacement frame construction 1510 may include a RP frame 16 constructed from an I frame 00 and applying information from a P frame 08 and a P frame 16 and re-encoding the P frame (e.g., RP frame 16) relative to the RI frame 08 of the first replacement frame construction 1608.

Figure 17:
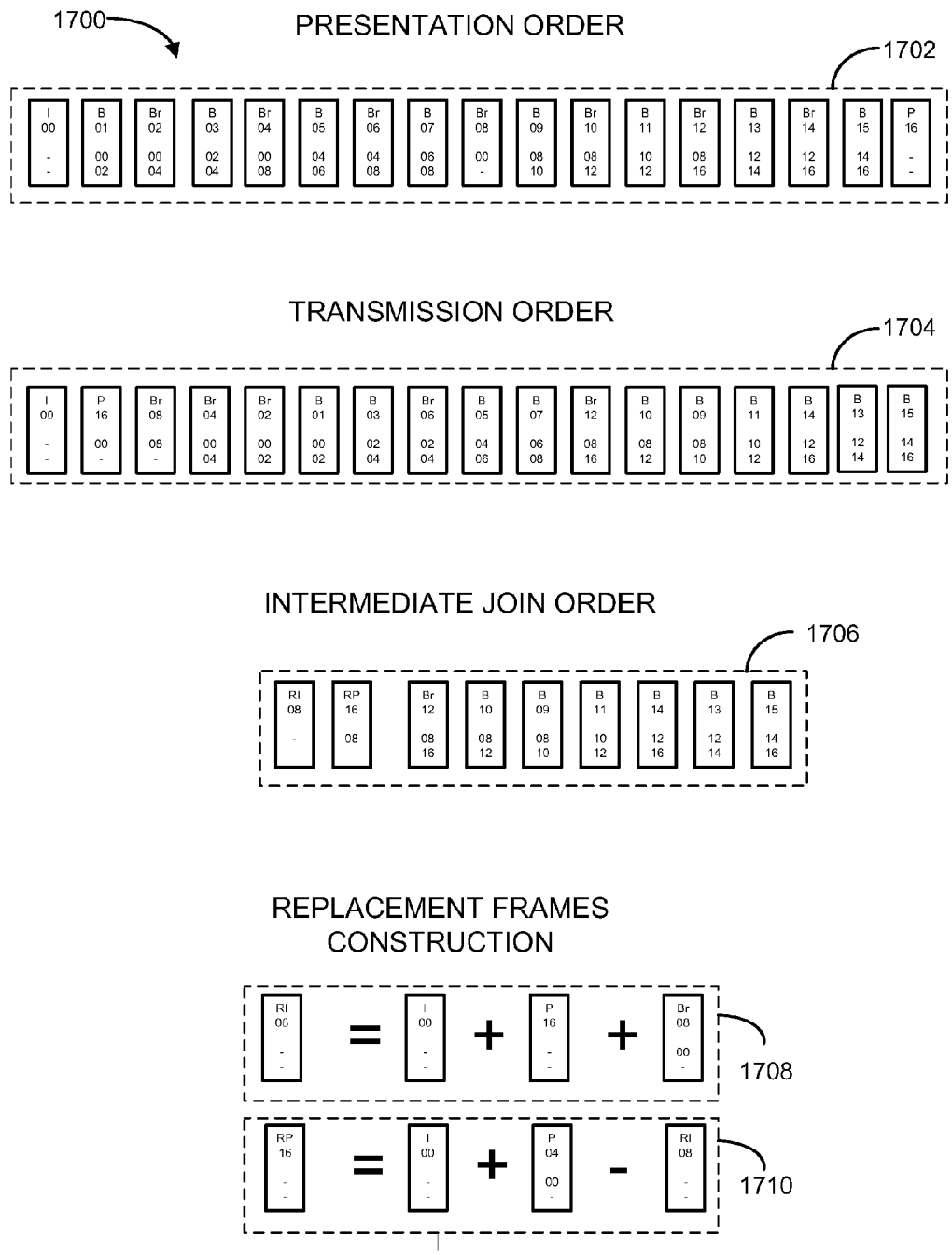

Referring to FIG. 17, a series of frames 1700 in accordance with an example embodiment is shown. In an example embodiment, the series of frames 1700 may use three levels of B reference frames.

A presentation order 1702 may indicate an order in which the series of frames 1700 are presented to a viewer. The presentation order 1702 is shown by way of example to be an I frame 00, a B frame 01, a Br frame 02, a B frame 03, a Br frame 04, a B frame 05, a Br frame 06, a B frame 07, a Br frame 08, a B frame 09, a Br frame 10, a B frame 11, a Br frame 12, a B frame 13, a Br frame 14, a B frame 15, and a P frame 16.

A transmission order 1704 indicates an example order in which the series of frames 1700 are received by a device. In The device may be one of the intermediate device 108.1, 108.2 (see FIG. 2), the switch/router 229 (see FIG. 2), or any other network device. The transmission order 1704 is shown to be an I frame 00, a P frame 16, a Br frame 08, a Br frame 04, a Br frame 02, a B frame 01, a B frame 03, a Br frame 06, a B frame 05, a B frame 07, a Br frame 12, a B frame 10, a B frame 09, a B frame 11, a B frame 14, a B frame 13, and a B frame 15.

An intermediate join order 1706 may include one or more reconstructed frames followed by a number of frames from the transmission order. The intermediate join order 1706 is shown to be a RI frame 08, a RP frame 16, a Br frame 12, a B frame 10, a B frame 09, a B frame 11, a B frame 14, a B frame 13, and a B frame 15.

As illustrated, a first replacement frame construction 1708 may include a RI frame 08 constructed from an I frame 00 and applying information from a P frame 16 and a Br frame 08, and a second replacement frame construction 1610 may include a RP frame 16 constructed from an I frame 00 and applying information from a P frame 04 and re-encoding the P frame (e.g., RP frame 16) relative to the RI frame 08 of the first replacement frame construction 1708.

Example Adaptive and Non-Adaptive Streaming

In at least some of the examples presented above, a user associated with a user device may select a particular channel or program of hierarchical data, such as compressed video content, from multiple such channels available for transmission or download to the user device. In some cases, the hierarchical data may be transmitted at a predetermined data rate, with some of the hierarchical data being dependent upon prior and/or subsequent hierarchical data. As discussed above, a router, switch, or server coupled with the user device may transmit initial data, such as buffered, delayed, or reconstructed hierarchical data, to allow the user device to begin presenting the hierarchical data more quickly to the user than what would otherwise be possible in the absence of the initial data.

Each of FIGS. 18-22 provide a block diagram of a video distribution system in which one or more data sources transmits video content to one or more video encoders. The encoders transform the video data into hierarchical video data, which is transmitted via one or more components to one or more devices, such as the intermediate devices 108 of FIG. 1, or the set-top box (STB) 238 of FIG. 2. In some examples, the devices of FIGS. 18-22 may also be end-user devices, such televisions, video monitors, desktop or laptop computers, mobile communication devices, and the like. Each of the systems of FIGS. 18-22 may incorporate any of the embodiments described above, such as the transmission of initial and additional hierarchical data to the one or more devices, as described in detail above.

Figure 18:
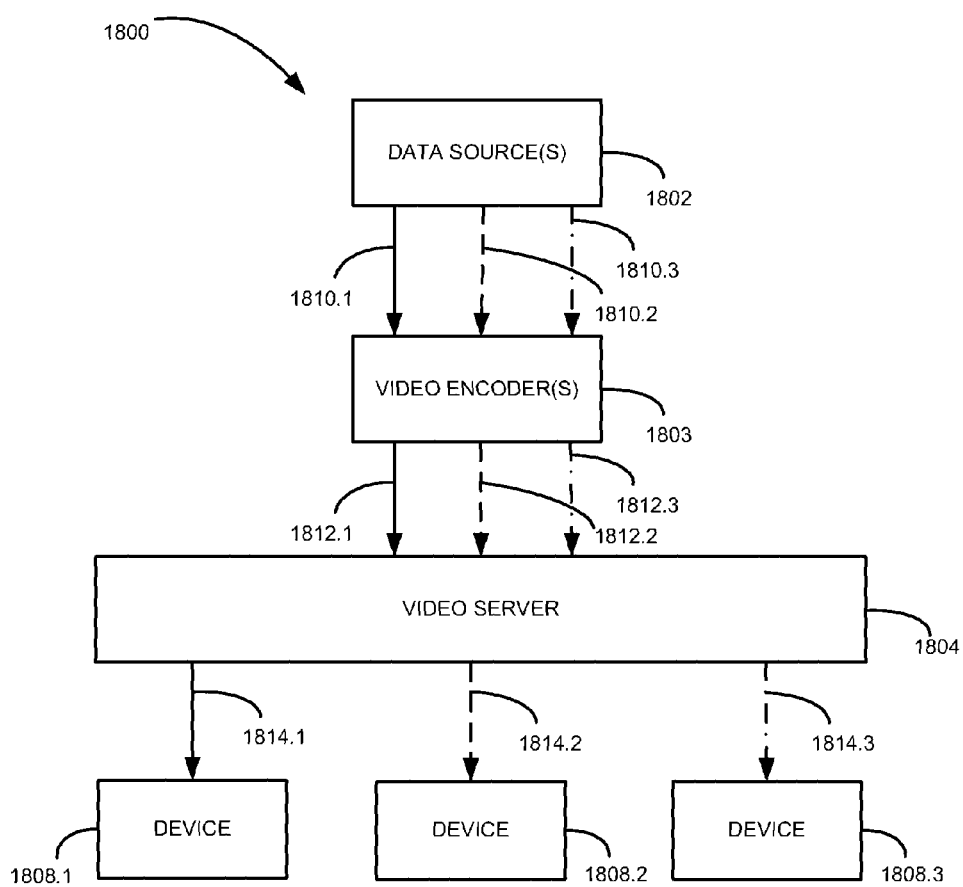
FIG. 18 is a block diagram of a video distribution system employing non-adaptive streaming using a point-to-point communication protocol in accordance with example embodiments.

FIG. 18 is a block diagram of an example video distribution system 1800 in which one or more data sources 1802 provide multiple channels of video data 1810.1, 1810.2, 1810.3 (generally, 1810) to one or more video encoders 1803, which generate hierarchical data 1812.1, 1812.2, 1812.3 for the video data 1810.1, 1810.2, 1810.3, respectively. Each channel of video data 1810 may represent, for example, different content (such as different television programs or movies) or different resolutions of the same content (such as high definition (HD) and standard definition (SD) for televisions, reduced definition for mobile devices, and so on).

A video server 1804 may then receive requests for one of the channels of hierarchical data 1812 from one or more devices 1808.1, 1808.2, 1808.3 for presentation to a user. In one example, each of the devices 1808 may connect to the server 1804 to receive information about the various programs. The programs may be, for example, real-time broadcast programs or video-on-demand (VOD) programs. Each device 1808 may then select and receive a program via the hierarchical data 1814.1, 1814.2, 1814.3 from the video server 1804 using a point-to-point transmission protocol, such as, for example, User Datagram Protocol (UDP) or Transmission Control Protocol (TCP), which may be associated with, for example, HyperText Transfer Protocol (HTTP) or Real Time Streaming Protocol (RTSP). In one example, the hierarchical data 1814 is transferred via a core network, such as the Internet. As a result of the point-to-point protocol, each device 1808 possesses its own connection between the device 1808 and the video server 1804, thus requiring the system 1800 to allocate the bandwidth required to carry each channel of the hierarchical data 1814 through the network from the video server 1804 to each device 1808, even if two devices 1808 are receiving the same program, and thus the same hierarchical data 1814. When switching to a particular channel of video data 1814, a device 1808 may receive initial hierarchical data from the video server 1804 to facilitate faster presentation of the associated program to the user, as described above.

In other video distribution systems, adaptive coding and streaming may be employed to provide a number of video streams for a particular program or channel, with each stream including hierarchical data being transmitted at a different data rate, and with higher data rates generally being associated with higher video resolutions and/or higher video quality. In one example, the video resolutions may range from a "super HD" and typical HD resolution presentable via an HD television, to an SD resolution, to a computer-class resolution, and finally to a low mobile device resolution.

Generally, adaptive streaming allows a device to select one of the multiple streams associated with a program for distinct periods of time, thus allowing the device to adjust the data rate of the video data being received to current or changing transmission conditions or link quality. For example, the device may not be properly receiving video data during a period of time at a data rate sufficient to match the rate at which the data is being presented to the user, such as during times of poor communication connectivity with a video server, or during periods of high communication traffic over the network connecting the device with the video server. In response, the receiving device may request that the next portion, or "chunk," of video data be from a lower-resolution or lower-quality stream, thus allowing the data rate of the transmitted video data to be reduced while maintaining an uninterrupted presentation of the program. If, during presentation of that video chunk, the video data is received more quickly than expected, the receiving device may then request a higher-resolution or higher-quality video data stream of the program for the next chunk.

Figure 19:
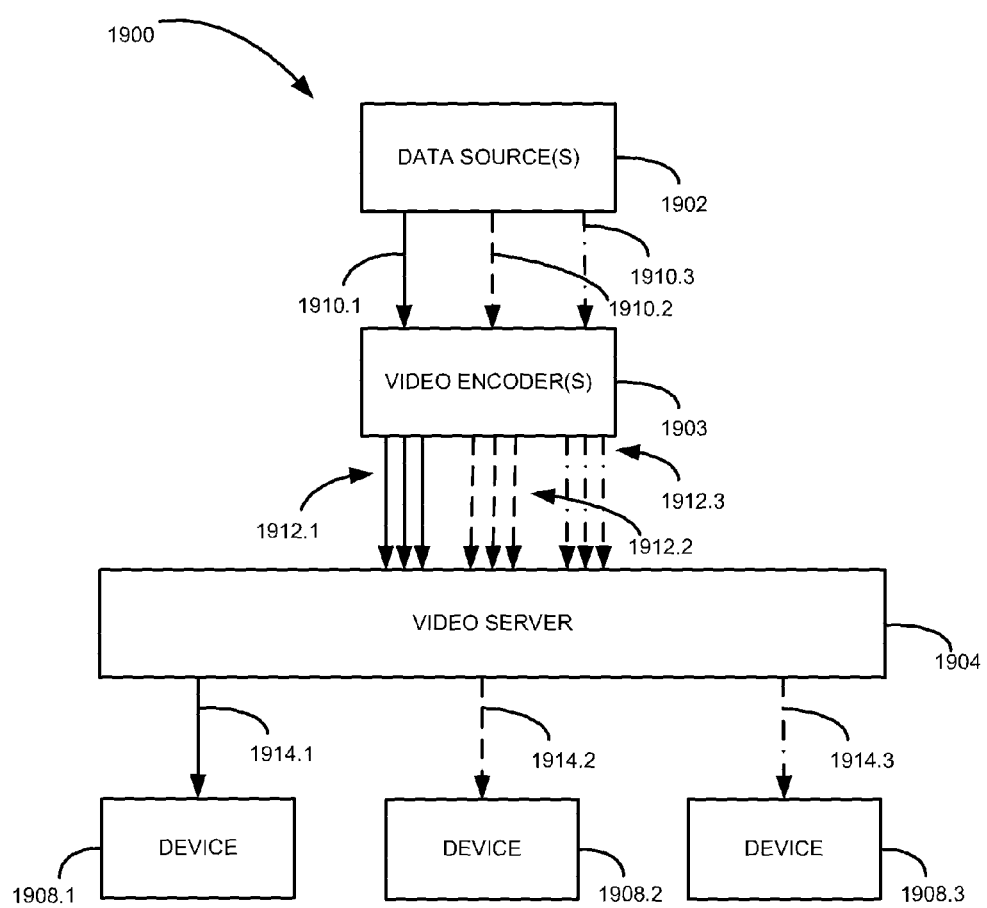
FIG. 19 is a block diagram of a video distribution system employing adaptive streaming using a point-to-point communication protocol in accordance with example embodiments.

FIG. 19 depicts an example video distribution system 1900 providing adaptive streaming functionality. In the system 1900, one or more data sources 1902 provide multiple channels of video data 1910 to one or more video encoders 1903. The encoders 1903, in turn, encode each channel of video data 1910 into multiple streams 1912 of varying video resolution/quality/data rate and transmit the streams 1902 to a video server 1904. While FIG. 19 depicts three streams 1912 for each channel of video data 1910, the video encoders 1903 may generate greater or fewer streams 1910 for each channel or program.

Each of multiple devices 1908 may then request a particular stream 1912 for the next chunk of video data to be received. In one example, the video server 1904 may provide information in the form of a "manifest," which indicates the various streams available for each program or channel, possibly along with other data, such as the data rate for each of the streams, the amount of data to be transferred in each stream for the next chunk, as so forth. As a result, the video server 1904 may issue a new manifest for each upcoming chunk of video data, or may provide a manifest for multiple chunks. Based on the information in the manifest and on current communication link quality, each device 1908 may request a particular stream 1914 for the next video chunk, and receive that chunk of the request stream 1914 from the video server 1904 in response. As with the system 1800 of FIG. 18, each device 1908 receives its hierarchical video data 1914 via a point-to-point connection so that communication bandwidth is dedicated for each device 1908 over its connection with the video server 1904.

As with switching from one channel to another, as described above, each device 1908 of the system 1900 may receive buffered, delayed, or constructed initial hierarchical data when switching from one chunk to another of the same program, thus possibly facilitating rapid switching between streams regardless of whether the chunks are aligned on hierarchical data boundaries.

Figure 20:
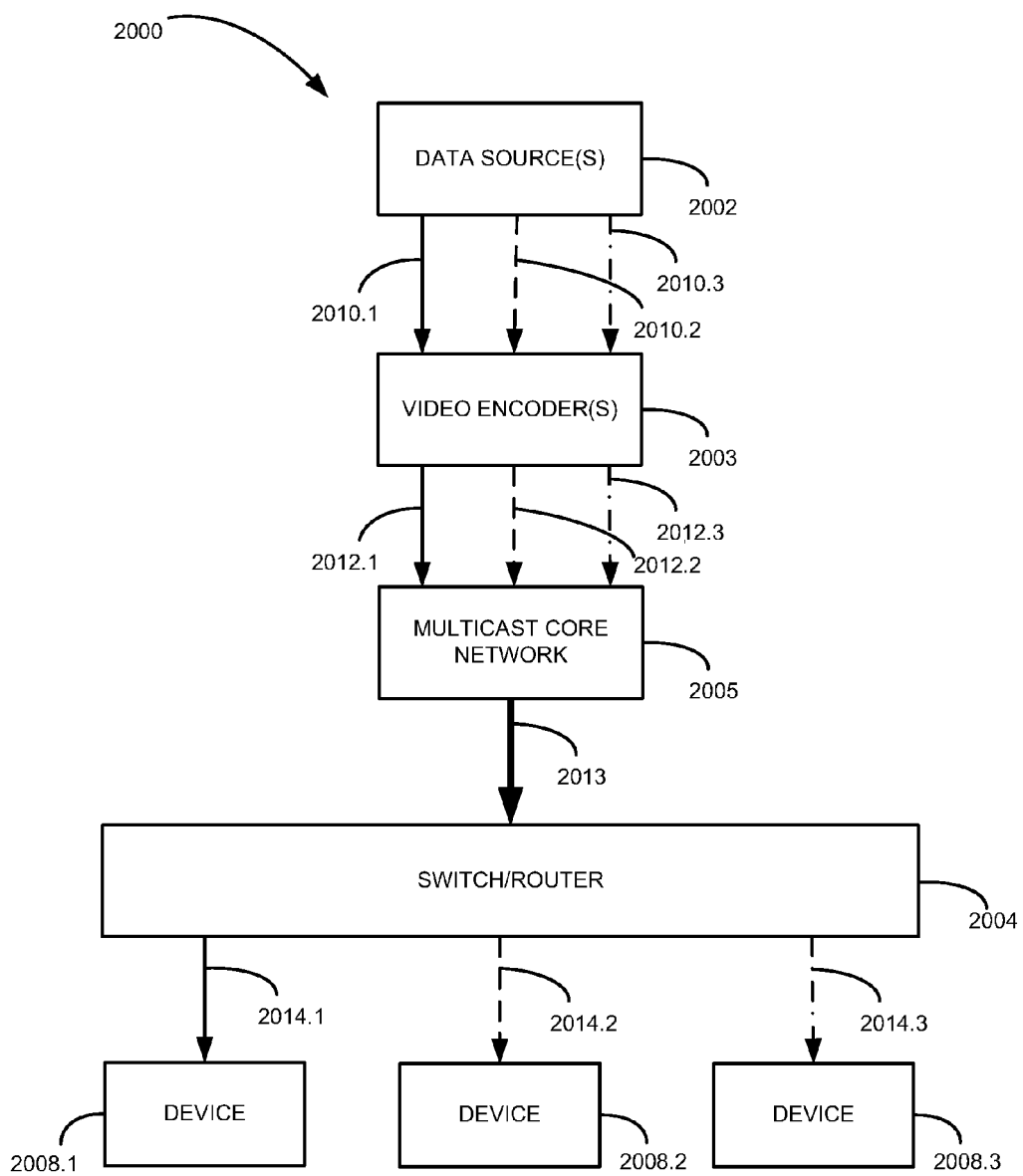
FIG. 20 is a block diagram of a video distribution system employing non-adaptive streaming using a multicast protocol in accordance with example embodiments.

FIG. 20 illustrates an example video distribution system 2000 in which multicasting may be employed to reduce the amount of bandwidth consumed over a core network for non-adaptive streaming of video data. In one embodiment, the system 2000 may be employed for Internet Protocol television (IPTV) transmission. In this example, at least one data source 2002 transmits multiple channels of video data 2010 to one or more video encoders 2003. The encoders 2003 encode each of these channels to a corresponding channel of encoded (hierarchical) video data 2012 for a multicast core network 2005. The multicast core network 2005 transports the hierarchical data 2012 as a multicast set 2013, with each channel of the multicast set 2013 representing the encoded video data 2012 for a channel received from the encoders 2003. As a result, multiple copies of encoded video data 2012 are not carried in the multicast set 2013, regardless of the number of devices 2008 requesting the same channel.

Also in the system 2000, a switch/router 2004 receives requests from one or more devices 2008 to receive video data of one of the video channels being carried in the multicast set 2013. In some examples, the switch/router 2004 may be, for example, an Internet cable or Digital Subscriber Line (DSL) gateway, or a DSL Access Multiplexer (DSLAM). In response to a request, the switch/router 2004 routes the video data 2114 of the requested stream to the requesting device 2008. As more than one device 2008 may request the same channel, the switch/router 2004 may route the same video data associated with the channel to the devices 2008 requesting that channel. As a result, network communication bandwidth need not be reserved for each device for the entirety of the connection from the multicast core network 2005 to the devices 2008 due to the multicast nature of the connection. Instead, duplicate bandwidth need only be reserved for the portion of the network that is unique to each device 2008 (sometimes termed "the last mile"), thus reducing the amount of bandwidth or capacity consumed in the multicast core network 2005 through the router 2004 and at least a portion of the communication path from the switch/router 2004 to the requesting device 2008.

In another example, multiple streams for each channel, with each stream exhibiting a different data rate, may also be available as multicasts to the devices 2008 via the router 2004. Under that scenario, each device may request different multicast streams on a chunk-by-chunk basis to adapt to changing link conditions.

However, in the case that two or more devices 2008 may be tuning to the video data of the same program, channel, or stream being received via multicast, the switch/router 2004 may not be able to provide initial hierarchical video data to a device 2008 just tuning to that channel to facilitate rapid presentation of the video data if another device 2008 is already receiving the video data for that same channel. Also, if only one multicast is provided for each program or channel from the switch/router 2004 to the devices 2008, the devices 2008 cannot adapt to a poor quality link by requesting a stream with a lower data rate, as none would be available.

Figure 21:
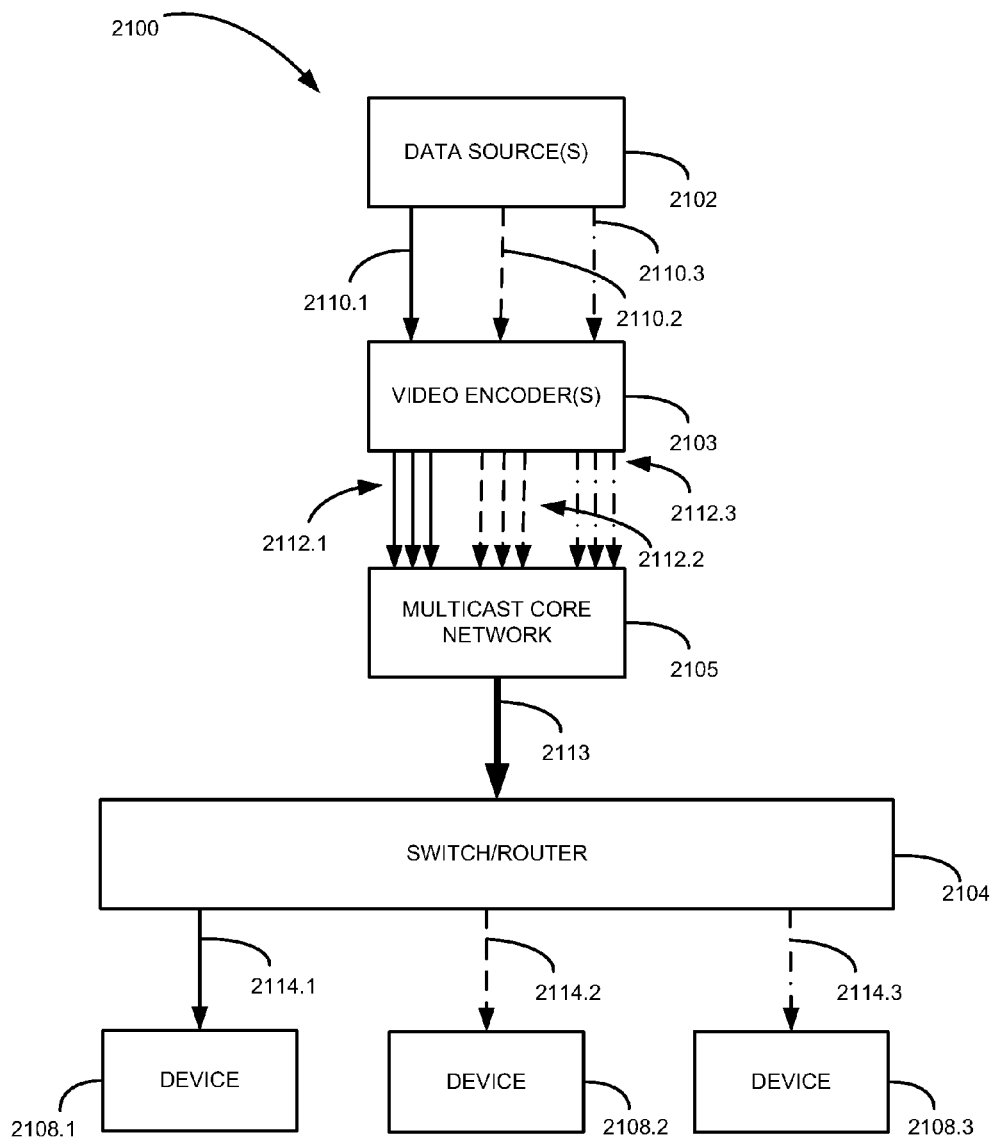
FIG. 21 is a block diagram of a video distribution system employing adaptive streaming using a hybrid multicast/point-to-point protocol in accordance with example embodiments.

To remedy this situation, FIG. 21 provides an example video distribution system 2100 that employs a hybrid multicast/point-to-point video transmission scheme. Similar to the system 2000 of FIG. 20, one or more data sources 2102 provide multiple channels of video data 2110 to at least one video encoder 2103, which generates multiple streams of video data 2112 for each channel or program received, with each stream carrying video data 2112 for a different video resolution/quality/data rate for adaptive streaming purposes. In another embodiment, the video encoder 2103 may generate a single video stream for each received channel for non-adaptive streaming environments, although an adaptive streaming embodiment is presumed in the discussion below.

The encoder 2103 forwards the streams of video data 2112 to a multicast core network 2105, which combines the streams into a set of multicasts 2113 and transmits the multicast set 2113 to a switch/router 2104. The switch/router 2104 may also receive a manifest or similar information from the video encoder 2103 via the multicast core network 2105 indicating the various streams available for each channel. The switch/router 2104 may then forward the manifest, or provide information similar to the manifest, to each of the devices 2108. Upon receiving the manifest or similar information, each of the devices 2108 may use the information to issue a request to the switch/router 2104 for a particular stream for a desired channel. In response, the switch/router 2104 may then deliver the chunk of the requested video data 2114 associated with the manifest to the requesting device 2108 via a point-to-point protocol. This process may be repeated for each chunk of video data that is available to the device 2108 to allow the device 2108 to switch streams of the same channel, thus adapting the data rate of the video data 2114 to changing link quality or other conditions.

Since a point-to-point connection, such as an HTTP-based or RTSP-based connection, is employed between the switch/router 2104 and the devices 2108, each connection between each device 2108 and the router 2104 is unique, such that duplicate streams of video data 2114 being received by two different devices is possible. However, the possibility of duplicate streams also allows the generation and transmission of initial video data, as described above in various embodiments, to enable rapid switching between different channels, or different streams of the same channel, of the video data 2114, which is not possible with multicasts extending from the multicast core network 2105 to some point beyond the router 2104. Since the multicast core network 2105 maintains the multicast set 2113 only as far as the router 2104, some significant savings in terms of communication bandwidth is achieved. As a result, in at least some examples, the router 2104 may operate as a point-to-point/multicast bridge, in which point-to-point requests for video data are converted into transmissions from a corresponding multicast connection.

In one example of the video distribution system 2100, the manifest or similar information, as well as each stream of each channel being transmitted, may collectively be considered to be hierarchical video data, which may be buffered, delayed, or constructed for rapid stream-switching purposes.

Figure 22:
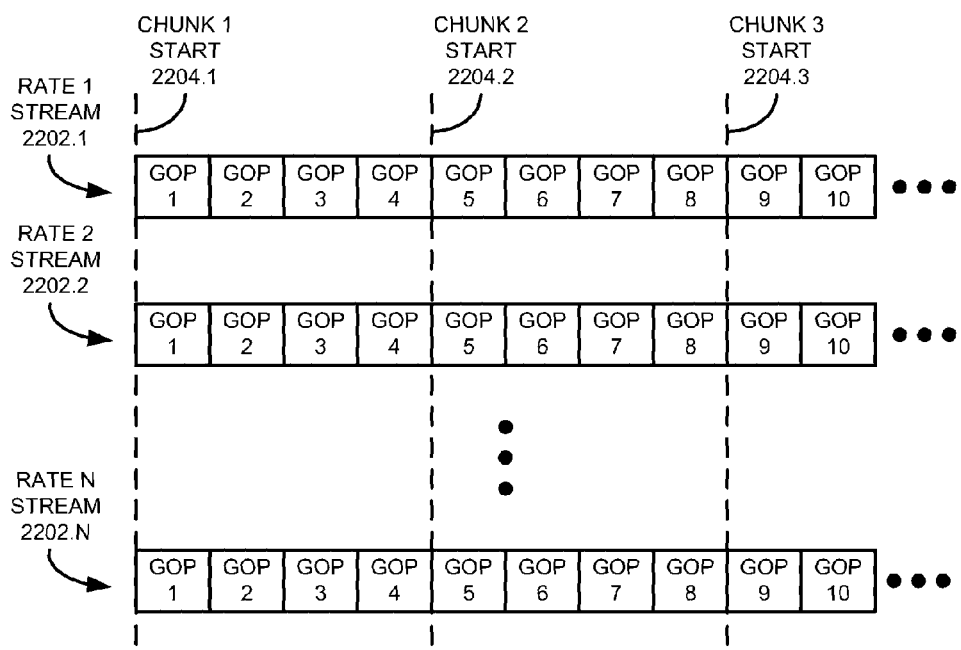
FIG. 22 is a diagram of multiple video streams for a channel in which chunks of each stream align with groups-of-pictures in accordance with example embodiments.

FIG. 22 shows an example of a channel of video data that includes N different video data streams 2202.1, 2202.2, . . . 2202.N of a program or channel in the context of the system 2100 of FIG. 21. Each of the data streams 2202 may represent a different resolution and, hence, data rate, for the channel or program content. Each of the streams 2202 is divided or apportioned into segments or chunks, with each chunk comprising multiple groups of pictures (GOPs). More specifically, Chunk 1 begins at staring point 2204.1, aligning with the start of GOP 1; Chunk 2 begins at staring point 2204.2, aligning with the start of GOP 5; and Chunk 3 begins at staring point 2204.3, aligning with the start of GOP 9. Other implementations may include any number of GOPs within each chunk, including one GOP per chunk. Each chunk may represent a fixed length of playing time of the video data contained therein, such as, for example, two seconds, although both shorter and longer chunk lengths are also possible. As a result of the chunk boundaries aligning with the GOP boundaries, switching from one stream 2202 to another within the same channel or program would not ordinarily cause a delay in waiting for the first picture or frame in a group of pictures while other frames of the video data hierarchy are being received in order to present the video data to the user. Thus, the router 2104 of the system 2100 need not buffer, delay, or construct initial data for transmission to the devices 2108, as described above.

Figure 23:
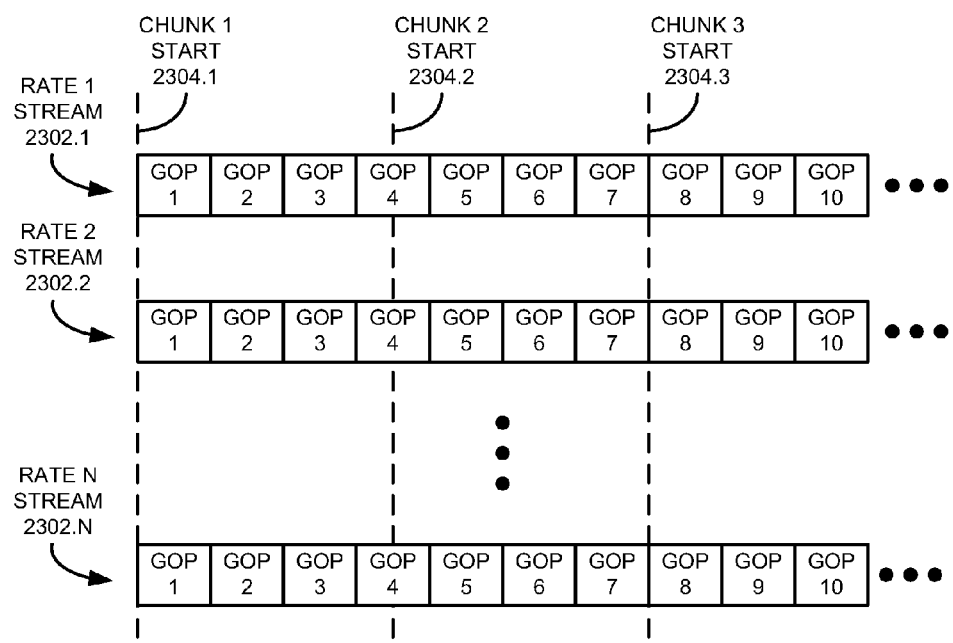
FIG. 23 is a diagram of multiple video streams for a channel in which chunks of each stream do not always align with groups-of-pictures in accordance with example embodiments.

Conversely, FIG. 23 depicts an example of multiple streams 2302.1, 2302.2, . . . 2302.N of the same channel or program of video data, wherein the chunk start positions 2304.1, 2304.2, 2304.3, and so forth, do not always align with an initial GOP frame, such as an I frame. Accordingly, if a device receiving the channel of video data switches from a chunk of one stream 2302 to the next chunk of another stream 2302, and that transition does not align with a GOP boundary (such as for example, the Chunk 2 start position 2304.2, which is positioned somewhere within GOP 4), the router 2104 may perform any buffering, delay, or constructing of initial video data to enable switching between streams 2302 without awaiting the next GOP (in this case, GOP 5). In one example, the chunk length may be much less than a GOP size, in which case the ability of the device 2108 to switch between streams 2302 rapidly, as discussed in detail above, may be important since most chunk boundaries would not align with, or be closely positioned near, a GOP boundary.

Figure 24:
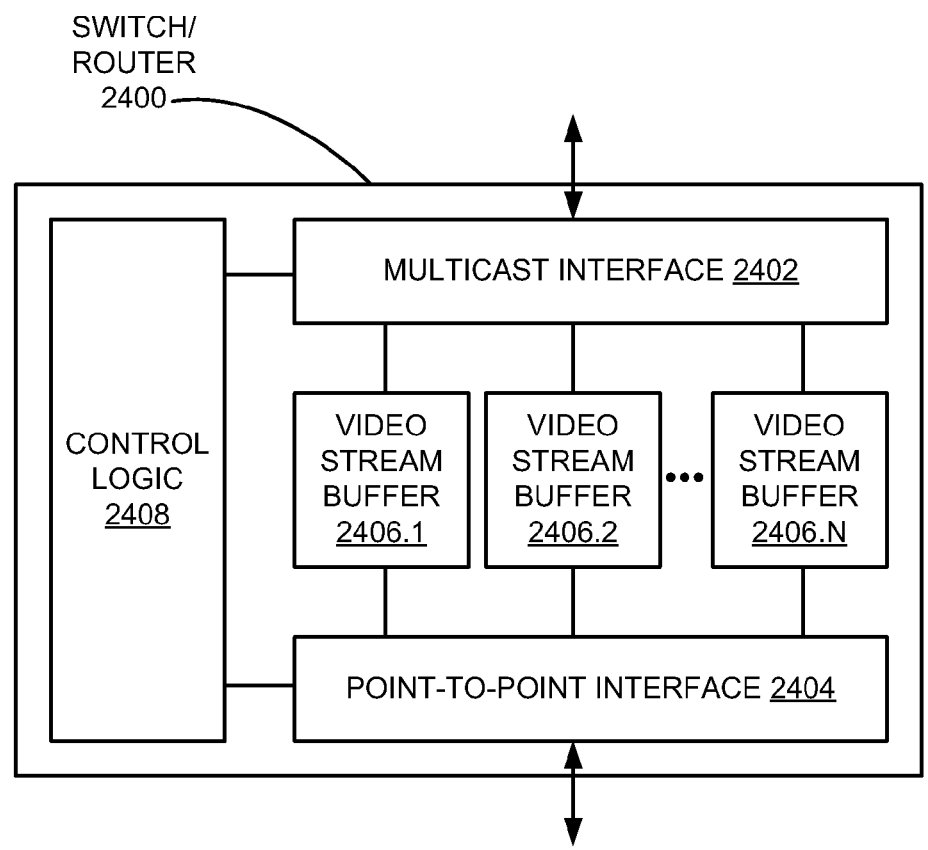
FIG. 24 is a block diagram of a switch/router of a video distribution system in accordance with example embodiments.

FIG. 24 is a block diagram of an example switch/router 2400, which may serve as the switch/router 2104 of FIG. 21, the switch/router 104 of FIG. 1, and/or the switch/router 229 of FIG. 2. As shown, the switch/router 2400 may include a multicast interface 2402, a point-to-point interface 2404, at least one video stream buffer 2406.1, 2406.2, . . . 2406.N, and control logic 2408. The switch/router 2104 may be embodied in hardware, software, firmware, or some combination thereof, as one or more machines, such as the computer system 3400 of FIG. 34 described below.

The multicast interface 2402 receives video data in multicasts provided by a multicast core network, such as the network 2105 of FIG. 21. The multicast interface 2402 stores at least some of the received video data in the one or more video stream buffers 2406 for subsequent processing and/or transmission. The multicast interface 2402 also transmits and/or receives any other information, such as adaptive streaming manifests, passing between the router 2400 and the multicast core network.

The point-to-point interface 2404 transmits video data from the one or more video stream buffers 2406 to one or more devices, such as the device 2108 of FIG. 21. The point-to-point interface 2404 also transmits and/or receives information related to the video data being transmitted, including, but not limited to, manifests for the use of the devices, and requests received from the devices for particular data streams. In other implementations described below, the switch/router 2400 may also include a second multicast interface for delivering multicasts to one or more of the devices.

The video stream buffers 2406 receive video data from the multicast interface 2402, store at least some of the received video data for some period of time, and then forward at least some of the video data to the point-to-point interface 2404 for transmission to the devices. In some examples, the video stream buffers 2406 may include other video data, such as frames constructed from the received video in order to provide initial hierarchical data, as discussed in greater detail above. In some embodiments, the video stream buffers 2406 may receive, store, and forward other information related to the video data, such as manifests.

The control logic 2408 controls the operation of the multicast interface 2402, the point-to-point interface 2404, and the video stream buffers 2406 so that the switch/router 2400 may perform the operations discussed below in conjunction with FIGS. 25-29 and 31. Examples of these operations include, but are not limited to, creating and adjusting the size of the video stream buffers 2406, processing and/or generating manifests, selecting video streams for transmission, and the like. Each of the operations discussed may not be executed in a strictly serial fashion in all examples, as indicated in the flowcharts of FIGS. 25-29 and 31, but may instead be performed in alternative orders, with some operations being executed partially or totally concurrently.

Figure 25:
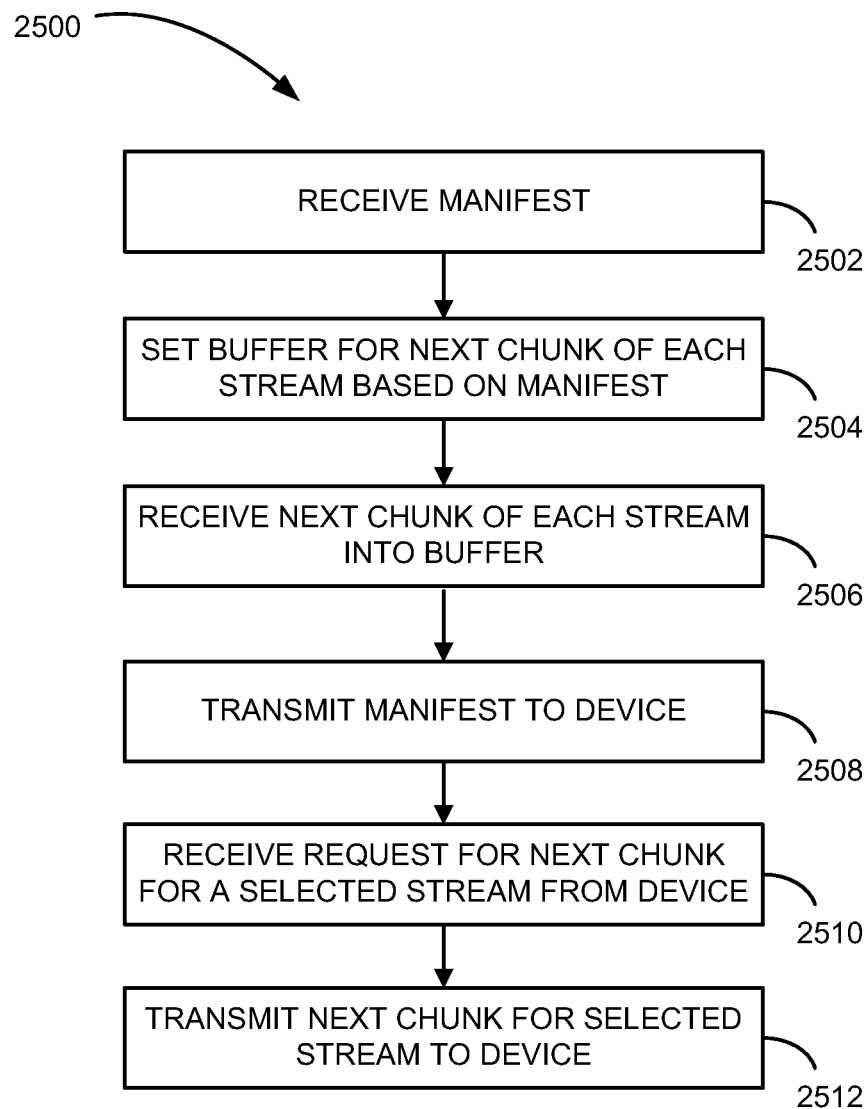
FIGS. 25-29 are flowcharts of methods of operating a switch/router to distribute video data to at least one device in accordance with example embodiments.

FIG. 25 is a flow diagram of an example method 2500 for receiving and distributing video data to one or more devices. In the method 2500, the router 2400 receives a manifest via the multicast interface 2402 indicating the various streams of video data that are being multicast (operation 2502). The manifest may also include other information related to each of the streams, such as information associating a given video stream with a specific program or content identifier that one or more devices may reference to request the stream. The manifest may also include information indicating the size of one or more chunks of each stream associated with the manifest, the data rates of each of the streams, and other information.

Based on the manifest, the switch/router 2400 may set a number of the video stream buffers 2406 to store a portion of each stream to be received and possibly distributed to a device (operation 2504). For example, the switch/router 2400 may allocate a video stream buffer 2406 for each stream to be received, with a buffer size of at least one chunk. In one example, the router 2400 may set the buffer size of the video data buffer 2406 for each stream to one chunk in the case that the router 3400 receives the manifest prior to the reception of any of the video data associated with that chunk. In another example, the router 2400 may set the size of each video data buffer 2406 to at least two chunks if the router 2400 is operated to forward a manifest for the next chunk while transmitting the current chunk to a requesting device. In another example, the length of each of the video stream buffers 2406 may be set for some minimum period of time associated with each chunk. In one embodiment, each of the video stream buffers 2406 may be organized as a dual "ping-pong" buffer in which a current chunk ready for transmission may be stored while the next chunk is being received into the buffer 2406.

The router 2400 transmits the manifest to each of the devices that may request one of the video data streams (operation 2508). In one example, the router 2400 transmits the manifest for the next chunk while the router 2400 transmits the current chunk of one or more data streams to the devices. The router 2400 may forward the manifest unchanged, or may revise or otherwise modify the manifest prior to transmission to the devices. For example, as described more fully below, the router 2400 may remove information relating to one or more of the video data streams to prevent the devices from requesting those video data streams. In another example, the router 2400 may increase or decrease the size of the chunks for each stream of a particular program or channel to modify the frequency at which the devices may request a particular stream for the next chunk to be transmitted from the router 2400.

The switch/router 2400 may then receive a request from a device for a chunk of a video data stream as identified in the manifest (operation 2510). As indicated earlier, the device may choose a particular stream based on the desired program or content, the display capabilities of the device, and the current perceived quality of the communication link between the device and the router 2400. In one example, the quality of the link may be deemed poor if the device is experiencing buffer "underruns," in which video data is emptied from a buffer of the device for presentation to a user before the next chunk of video data is received into that buffer.

In response to the request, the router 2400 transmits the next chunk of the requested video data stream from the associated video stream buffer 2406 via the point-to-point interface 2404 to the device (operation 2512). If the request does not align with a GOP boundary or similar hierarchical data boundary, the router 2400 may transmit previously buffered or delayed data for the requested stream as initial data to accelerate presentation of the video data to the user. In another example, the router 2400 may construct initial data from one or more video frames stored in the appropriate video stream buffer 2406 for transmission as initial data to the requesting device.

The router 2400 may receive several such data stream requests from multiple devices (operation 2510), and transmit a chunk of a requested video data stream (operation 2512) in response to each of the received requests. Further, any and/or all of the operations 2502-2512 may be performed repeatedly for each manifest received.

Figure 26:
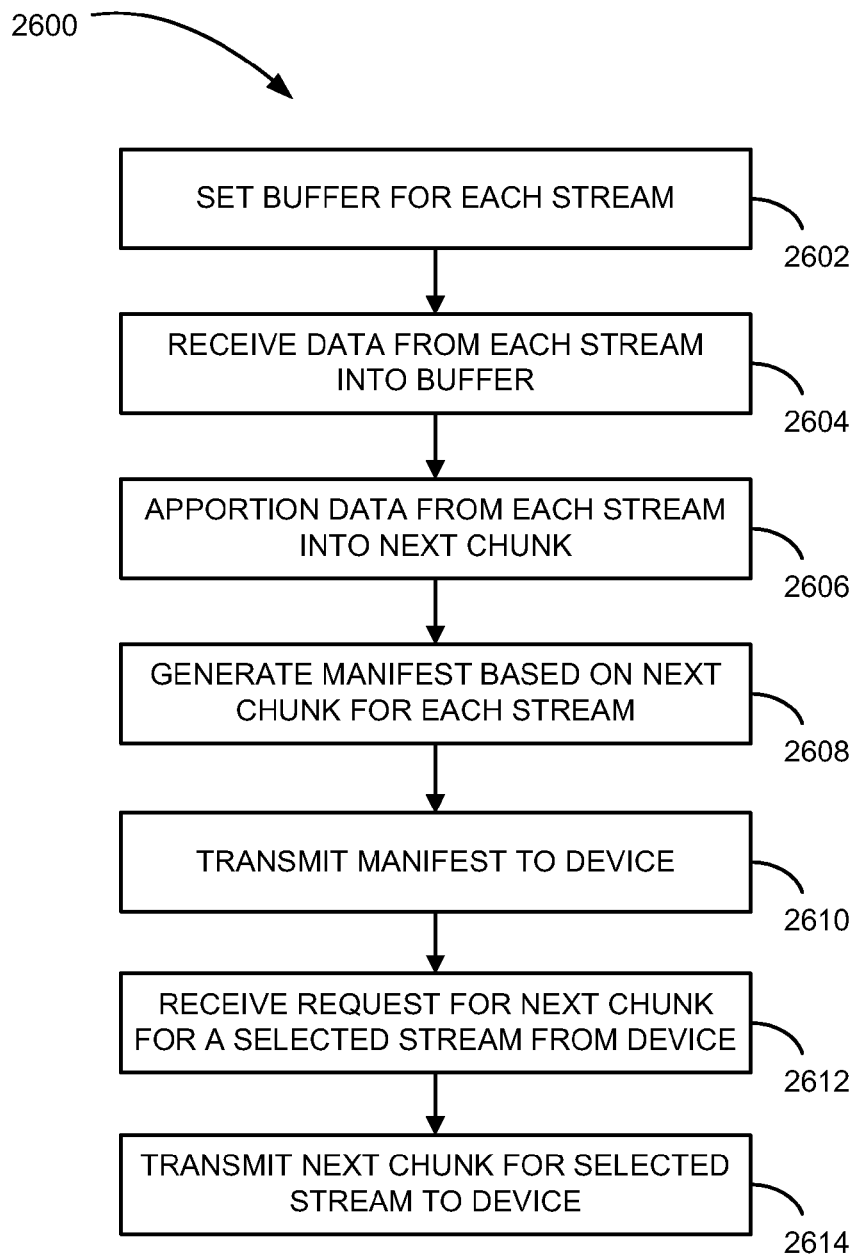

FIG. 26 depicts another example method 2600 of operating the switch/router 2400 for receiving and distributing video content in which a manifest is not provided to the router 2400. In the method 2600, the router 2400 sets the one or more video stream buffers 2406 for receiving the various video streams available in a set of multicasts (operation 2602). In one example, the router 2400 sets the number of video stream buffers 2406 based on a directory identifying each of the multicast streams, along with any other information associated with each stream, such as stream data rate information. In another example, the router 2400 may set the length of each of the video stream buffers 2406 in terms of one more multiples of a chunk size determined by the router 2400, or based on an amount of presentation time associated with each of the streams.

In response to the setting the video stream buffers 2406, the router 2400 may receive a portion of each of the streams of the multicast set into its respective buffer 2406 (operation 2604). Also, the router 2400 apportions the video data of each stream into one or more chunks (operation 2606). The router 2400, in one example, may determine the chunk size based on a desired amount of presentation time for each chunk.

In response to determining the chunk size and apportioning each of the received stream portions accordingly, the router 2400 may generate a manifest for providing information concerning each of the next video stream chunks stored the video stream buffers 2406 (operation 2608). As indicated above, the manifest provides information regarding each chunk, possibly including, but not limited to, the data size of each chunk, the presentation time associated with each chunk, and the data rate at which the chunk may be transmitted. After generating the manifest for the next chunk, the router 2400 transmits the manifest to each of the devices that are communicatively coupled with the router 2400 (operation 2610). The router 2400 may transfer the manifest for the next chunk while the router 2400 is transferring the current chunk of one or more data streams to the devices.

As with the method 2500 of FIG. 25, the method 2600 may receive one or more requests for a next chunk of a selected stream from one or more devices (operation 2612). In response to each request, the router 2400 transmits the next chunk of the requested stream to each of the requesting devices (operation 2614). Also similar to the method 2500, if the request does not align with a GOP boundary or similar hierarchical data boundary, the router 2400 may transmit previously buffered or delayed data for the requested stream as initial data to accelerate presentation of the video data to the user. In another example, the router 2400 may construct initial data from one or more video frames for transmission as initial data to the requesting device.

The router 2400 may receive several data stream requests from multiple devices (operation 2612), and transmit a chunk of the requested video data stream (operation 2614) in response to each of the received requests. Further, any and/or all of the operations 2602-2614 may be performed repeatedly for each subsequent portion of the video streams received into the router 2400.

Figure 27:
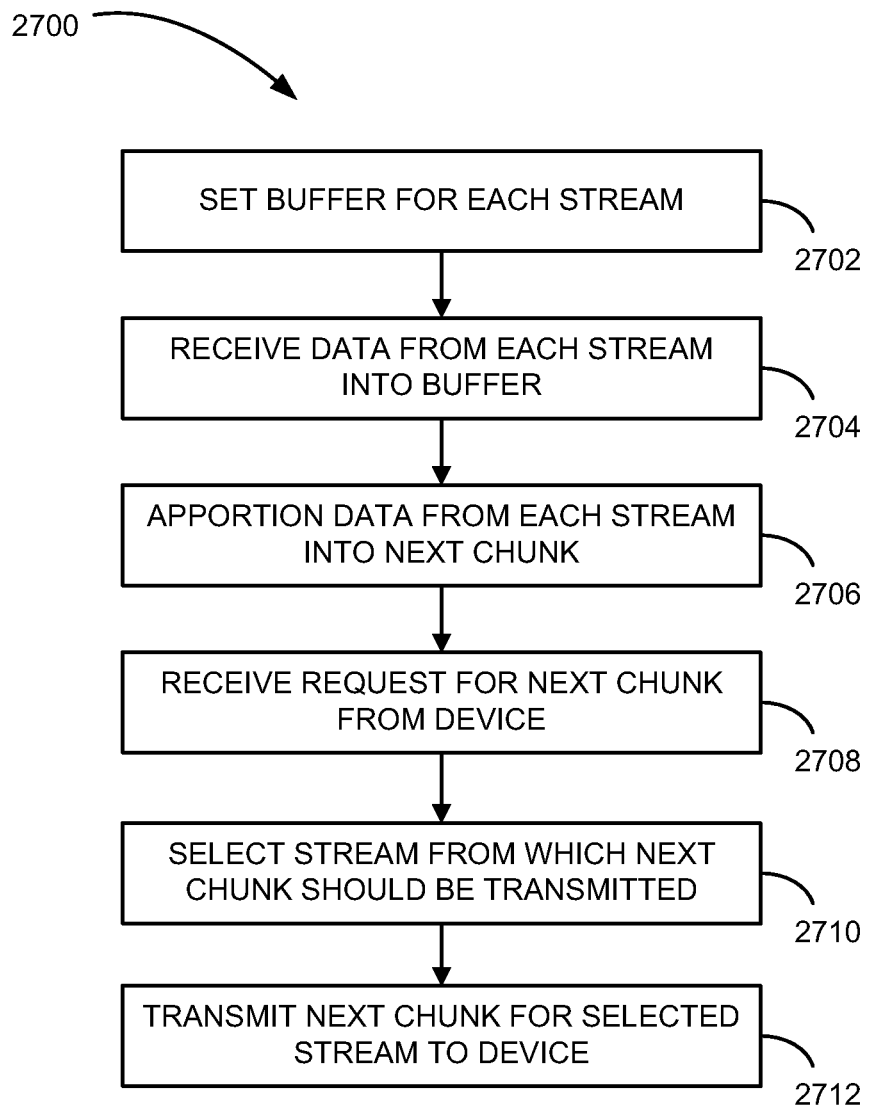

FIG. 27 presents another example method 2700 of operating the router 2400 in which manifests are not transmitted to the devices. As described in greater detail above with respect to the method 2600 of FIG. 26, the method 2700 sets a video stream buffer 2406 for each video stream to be received via multicast (operation 2702). Similar to the previous method 2600, the router 2400 receives the video data for each multicast stream into its corresponding buffer 2406 (operation 2704) and apportions data from each stream into the next chunk to be provided to one or more of the devices (operation 2706).

The router 2400 may then receive from a device a request for the next chunk for a data stream associated with desired channel or program (operation 2708). Unlike previous methods 2500, 2600, the device does not select a particular stream in the request, as the device has not received a manifest from the router 2400 indicating the streams that are available for a particular channel. However, as part of the request, the device may indicate some preference regarding the resolution, data rate, or quality of the next chunk being requested. In response to the request, the router 2400 selects the stream from which the next chunk should be transmitted (operation 2710). In one implementation, the router 2400 may select the stream from which the chunk is to be transmitted on the basis of any preferences indicated by the device, as well as on any information the router 2400 has received regarding the communication link between the router 2400 and the specific device. For example, on the basis of packet or message acknowledgments transmitted by the device to the router 2400 during the transfer of previous chunks, the router 2400 may determine that chunks associated with a higher or lower data rate compared to the data rate of previously transmitted chunks are a better fit for the communication link between the router 2400 and the device. In one embodiment, for initial transfers of chunks to a device, the router 2400 may select low-data-rate streams, then may progress to higher data rate chunks until the router 2400 determines that the data rate of the chunks nearly matches the bandwidth of the connection between the router 2400 and the device.

The router 2400 then transfers the next chunk for the selected stream to the device (operation 2712). As with previous methods 2500, 2600, if the request does not align with a GOP boundary or similar hierarchical data boundary, the router 2400 may transmit previously buffered or delayed data for the requested stream as initial data to accelerate presentation of the video data to the user. Also, the router 2400 may construct initial data from one or more frames for transmission as initial data to the requesting device.

The router 2400 may receive chunk requests from multiple devices (operation 2708), select a specific video data stream (operation 2710), and transmit the next chunk of the selected stream (operation 2712) in response to each of the received requests. Further, any and/or all of the operations 2702-2712 may be performed repeatedly for each subsequent portion of the video streams received into the router 2400.

Figure 28:
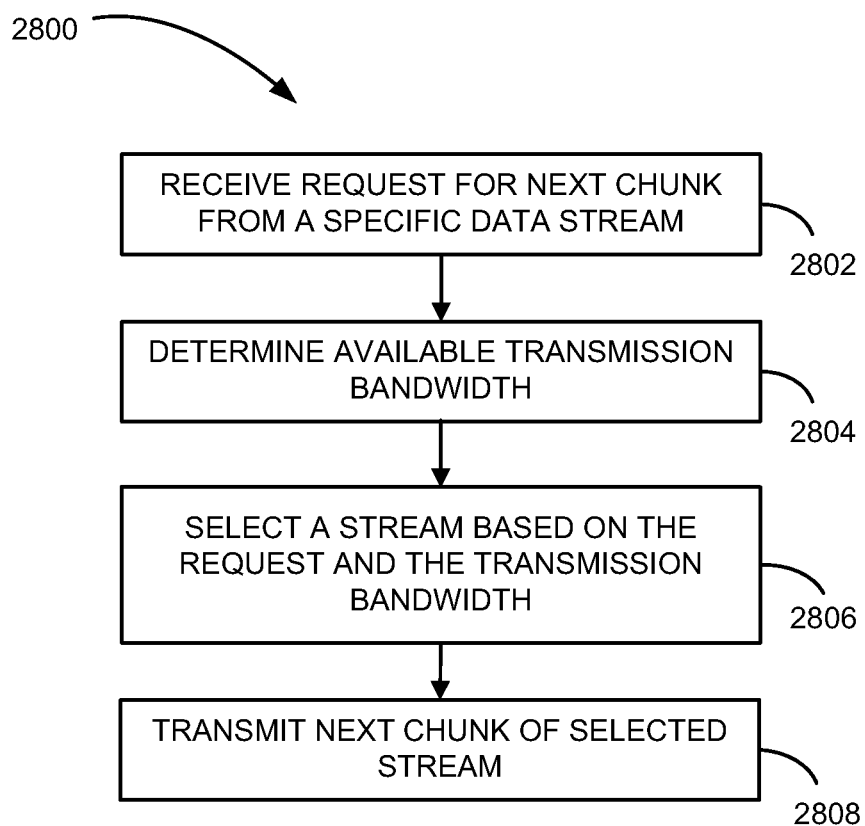

FIG. 28 illustrates an example method 2800 of operating the router 2400 for distributing video data to devices in which the router 2400 may override a request from a device for a specific data stream. The method 2800 focuses on the transfer of video data from the router 2400 to the devices, and thus does not describe the process of receiving and storing the video data of the streams. However, the method 2800 may be employed with any of the operations of methods 2500, 2600, and 2700 concerning the receiving and storing of video data in the video stream buffers 2406 of the router 2400.

In the method 2800, the router 2400 may not be capable of receiving all data streams of all programs or channels simultaneously due to bandwidth or memory capacity constraints. In such cases, the router 2400 may be able to transmit a video data stream to a second device that is already being viewed by a first device, even if that stream was not the stream requested by this device. Put another way, the router 2400 may select, for the same program or channel, a different stream for the next chunk than that specifically requested by the device, such as in the case of limited communication bandwidth in receiving the data streams into the router 2400. Such a condition may persist until, for example, the router 2400 is capable of receiving chunks of the requested stream.

In other examples, the router 2400 may be bandwidth-limited in transmitting video data streams to the devices as well. In that case, the router 2400 may select streams with lower data rates that those requested by one or more of the devices to ensure that each of the devices will receive the desired programming without buffer underruns or similar maladies, albeit at potentially lower-than-desired data rates.

In the method 2800, the router 2400 may receive a request for the next chunk available from a specific data stream (operation 2802). In response, instead of automatically transferring the next chunk of the specific data stream, the router 2400 may determine the communication bandwidth available to the router 2400 for transmitting video data to the requesting device (operation 2804). As part of the bandwidth determination, the router 2400 may analyze the data rates of video data that the router 2400 is currently transmitting to the other devices to determine if the data rates associated with any of those devices may be reduced to allow the first device to receive its desired program. The router 2400 may then select a stream from which the next chunk will be transmitted to the requesting device based on the requested stream and the available bandwidth (operation 2806), and transmit the next chunk of the selected stream to the device (operation 2808).

In performing the operations 2802-2808 of the method 2800, the router 2400 may adjust the stream from which the next chunk is to be transmitted for each device as that device requests its next chunk via operations 2802-2808. In some examples, the router 2400 may be able to anticipate potential bandwidth problems and reduce data rates of one or more devices before another device begins requesting video data. In other examples, the router 2400 may coordinate with one or more other routers 2400 (not explicitly shown in FIG. 24) to ensure that any bandwidth shared by the routers 2400 may be apportioned among the routers 2400 in a similar fashion to ensure reasonable access to the video data by as many devices as possible.

As with previous methods 2500, 2600, 2700, if the request does not align with a GOP boundary or similar hierarchical data boundary, the router 2400 may transmit previously buffered or delayed data for the requested stream as initial data to accelerate presentation of the video data to the user. Also, the router 2400 may construct initial data from one or more frames for transmission as initial data to the requesting device.

Figure 29:
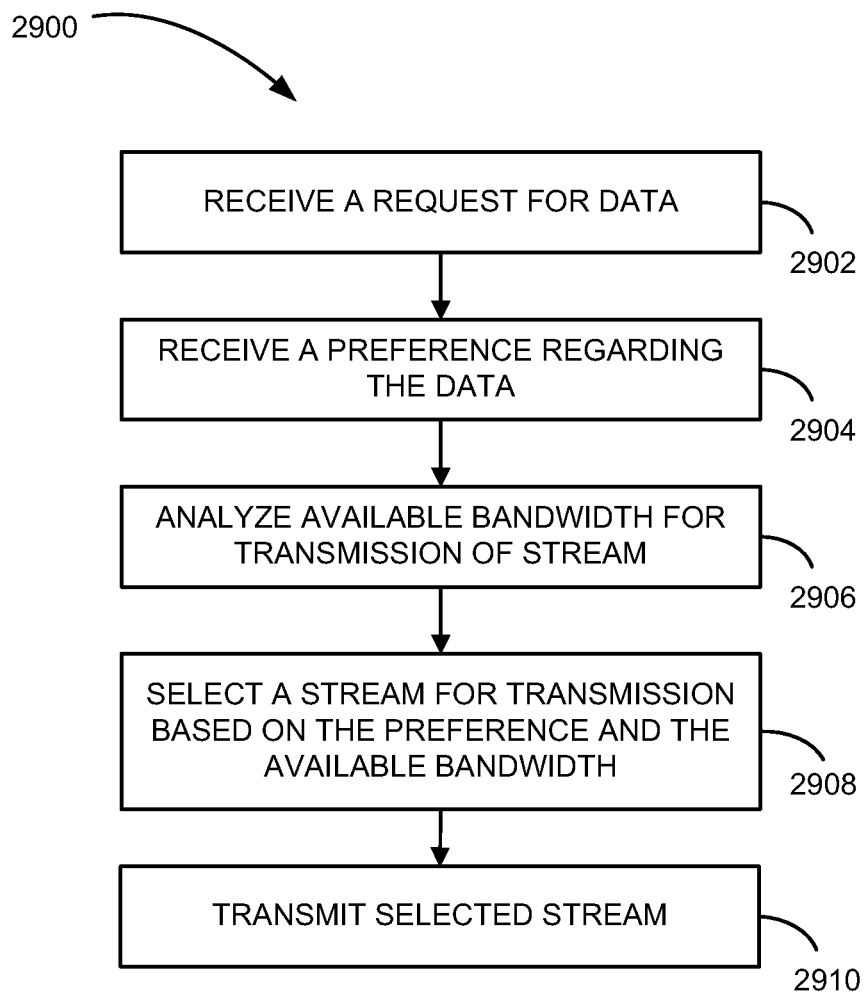

FIG. 29 depicts a method 2900 of operating the router 2400 to distribute video data to multiple devices without providing the video data in predetermined segment or chunks. In some implementations, the router 2400 may monitor data rate feedback from the devices receiving video data from the router 2400. Based on this feedback, the router 2400 may adjust the data rate of subsequent video data to be transmitted to each device without waiting for a particular chunk or GOP boundary. As a result, the router 2400 may employ the techniques described above regarding the transmission of initial data by way of buffered, delayed, or constructed video data from virtually any random access point in any data stream, thus allowing the router 2400 to adjust rapidly to changing link quality, bandwidth demands, and so on. This capability may be important for wireless and mobile devices, which typically operate in environments in which the link quality may vary significantly over time.

In the method 2900, the router 2400 receives a request for video data for a desired channel or program (operation 2902). In some examples, the router 2400 may also receive a preference regarding the data rate or video resolution at which the requesting device is to receive the video data (operation 2904). In some implementations, the router 2400 may receive such a request when the requesting device wishes to join a new channel or program, as opposed to explicitly and periodically requesting chunks of video data from a selected data stream associated with the program. Such a scheme allows the router 2400 to continuously monitor and determine an appropriate data stream of the desired program or channel for transmission to the device.

In some embodiments, the router 2400 may analyze or determine the communication bandwidth available for transmission of a data stream (operation 2906). In one example, the router 2400 may make such a determination based on video data packet acknowledgements, such as those provided when a TCP/IP connection is employed between the router 2400 and the devices to transfer the video data. The router 2400 may employ the acknowledgments to deduce an average data reception or download rate at each of the acknowledging devices. Other methods of determining available bandwidth from one or more devices may be utilized in other implementations.

Based on the determined available bandwidth, the channel or program request, and any rate preference indicated by the device, the router 2400 selects a particular video stream of the requested program or channel (operation 2908) and begins transmitting the selected video stream to the requesting device (operation 2910). In one example, the router 2400 may also adjust the data rates for multiple devices on an ongoing basis in light of new devices requesting video data and other changes in the communication environment, as described above with respect to the method 2800 of FIG. 28. Further, the router 2400 may coordinate with other routers 2400 to apportion any shared bandwidth between the routers 2400 and the devices, as described above.

In each example described above in which the router 2400 either overrides a device request for a data stream of a particular data rate, or in which the router 2400 selects a particular stream exhibiting some data rate for the device in the absence of a data rate preference from the device, the router 2400 may or may not provide the device with information concerning the data rate of the selected stream.

Further, in each of the implementations discussed above that employ chunks, the router 2400 may or may not await the arrival and storage of a complete chunk into a corresponding video stream buffer 2406 before initiating transmission of the chunk to a requesting device. In one example, the router 2400 can being transmission of a chuck from a buffer 2406 while at least some of the chunk is yet to be received into the buffer 2406 via the multicast interface 2402 if the router 2400 possesses enough information to ensure that the remainder of the data for the chunk will be available in the buffer 2406 by the time that data must be transmitted to the device. The router 2400 may make this determination based upon one or more types of information, such as, for example, the quality of the link between the router 2400 and the receiving device, and/or the data rates of the video data both being received into the buffer 2406 and being transmitted out of the buffer 2406.

In each of the embodiments described above, a device may receive one or more video data streams via multicast from the router 2400, as opposed to a point-to-point connection. For example, since the router 2400 may be receiving multiple streams for the same program via multicast, with each stream possessing a different data rate, the router 2400 may possess the capability to provide one of those streams to a device via multicast. Thus, in any of the embodiments discussed above in which, for example, the device determines the data rate, or the router 2400 overrides the device request, or the router 2400 determines which stream to provide to the device, the selected stream may be transmitted via multicast. Further, embodiments in which the router 2400 provides no manifests to the device, or provides the streams in a "chunkless" format, may also transmit the resulting stream via multicast to the device.

Figure 30:
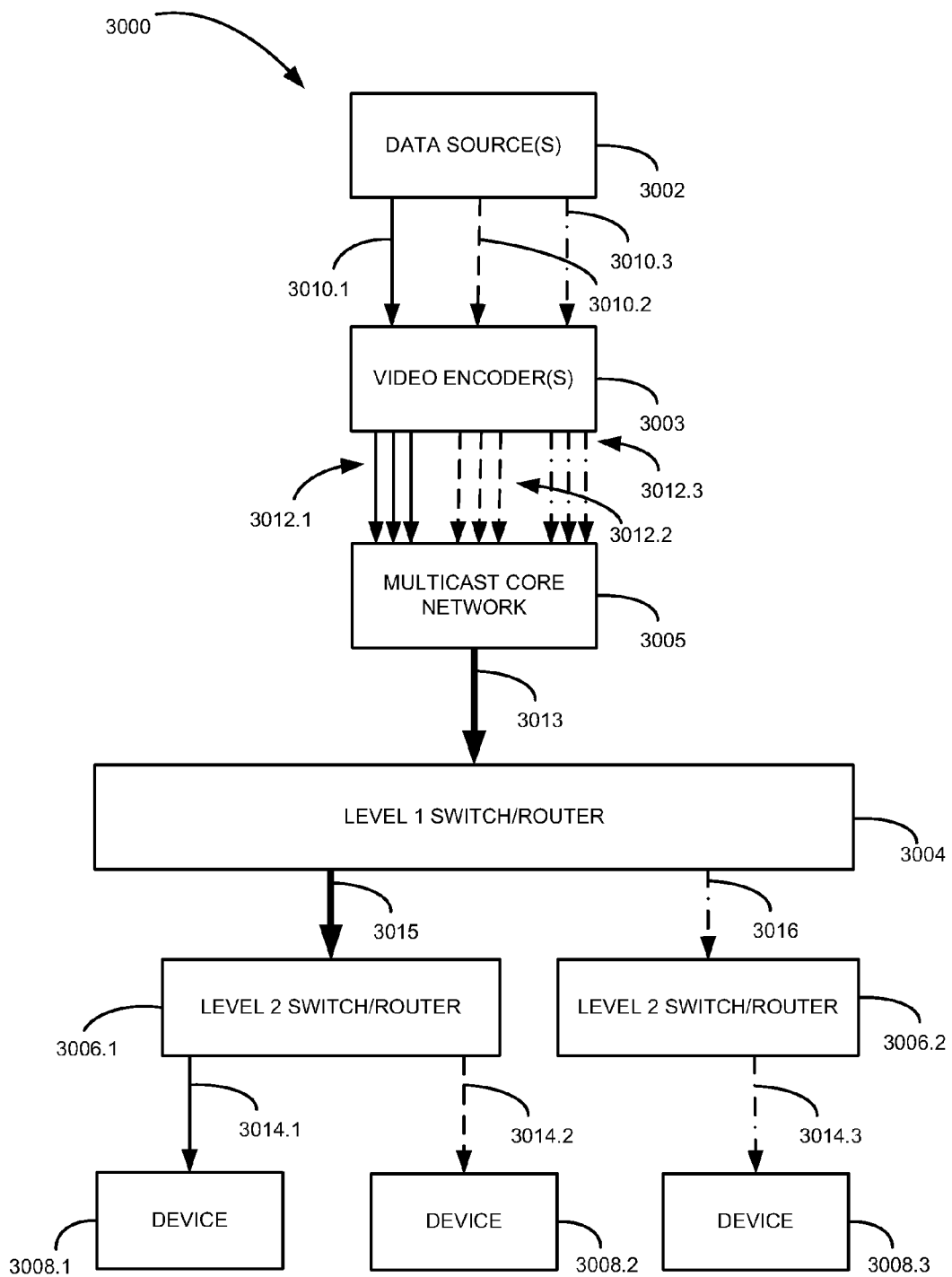
FIG. 30 is a block diagram a video distribution system employing multiple levels of switch/routers in accordance with example embodiments.

FIG. 30 is a block diagram of a video distribution system 3000 in which multiple layers of switch/routers 3004, 3006 may be employed to enhance the ability of the system 3000 to adjust to changing levels of link quality, communication bandwidth, and the like. FIG. 30 provides a two-level switch/router scheme, but more than two levels of switch/routers may be employed in other embodiments.

Similar to the distribution system 2100 of FIG. 21, one or more data sources 3002 may provide multiple channels of video data 3010 to at least one video encoder 3003, which generates multiple streams of video data 3012 for each channel or program received, with each stream carrying video data 3012 for a different video resolution/quality/data rate for adaptive streaming purposes. In other non-adaptive examples, only one stream per channel may be provided. The encoder 3003 forwards the streams of video data 3012 to a multicast core network 3005, which combines the streams into a set of multicasts 3013 and transmits the multicast set 3013 to a first-level switch/router 3004. The first-level switch/router 3004 may also receive a manifest or similar information from the video encoder 3003 via the multicast core network 3005 indicating the various streams available for each channel, although the system 3000 may operate under a manifest-free configuration, as described in greater detail above.

The first-level switch/router 3004 may then forward video data (and any related manifests or similar information, if present) to one or more second-level switches/routers 3006 for the benefit of one or more devices 2108. In one example, the first-level router 3004 and the second-level routers 3006 may communicate using a mixed multicast/point-to-point scheme. As shown in the example of FIG. 30, the first-level router 3004 provides one or more multicasts 3015 to one second-level router 3006.1, while the first-level router 3004 provides one or more point-to-point video streams 3016 to another second-level router 3006.2. In other examples, a second-level router 3006 may receive any number of multicasts and/or point-to-point streams from the first level-router 3004. According to one implementation, the first-level router 3004 may receive all available streams for each program or channel, while the first-level router 3004 provides only the most popular programs as multicasts to the second-level routers 3006, with the second-level routers 3006 managing requests from their connected devices 3008 for those programs, and delivering the requested video data 3014 to the corresponding devices 3008 via a point-to-point protocol. If one of the devices 3008 requests video data for a less popular program, the second-level router 3006 may, in turn, request that program from the first-level router 3004. In response, the first-level router 3004 may then deliver the requested program via a point-to-point connection to the second-level router 3006, which then delivers that video data via its point-to-point connection to the requesting device 3008. Accordingly, the first-level router 3015 and the second-level routers 3006 may communicate via a protocol that identifies which programs are available to the second-level routers 3006 via multicast, and which are available via a point-to-point connection. In addition, the first-level router 3006 may switch a video stream for a program or channel from multicast to point-to-point delivery based on the popularity of the program and other factors, with the more popular programs being transmitted via multicast in one example.

In some implementations, the second-level routers 3006 may directly serve requests from devices 3008 that are requesting video data for a program that the second-level router 3006 is currently providing to another device 3008 without any additional communication with the first-level router 3004.

In any of the examples regarding the router 2400 described above, some of the hierarchical data, such as either the video streams themselves, or any associated adaptive streaming manifests or similar information, may be reduced or limited before being presented to the devices. In one example, in cases mentioned above in which the router 2400 may not have access to enough communication bandwidth to transmit the video data for each requested video stream, the router 2400 may pre-emptively remove any video streams with higher data rates from the manifest that would oversubscribe the capacity of the communication link between the router 2400 and its devices. At a later time in which more bandwidth is available in the link, the router 2400 may then reintroduce the information for the higher-data-rate stream back into the manifest to make the associated video data streams available to the devices.

Figure 31:
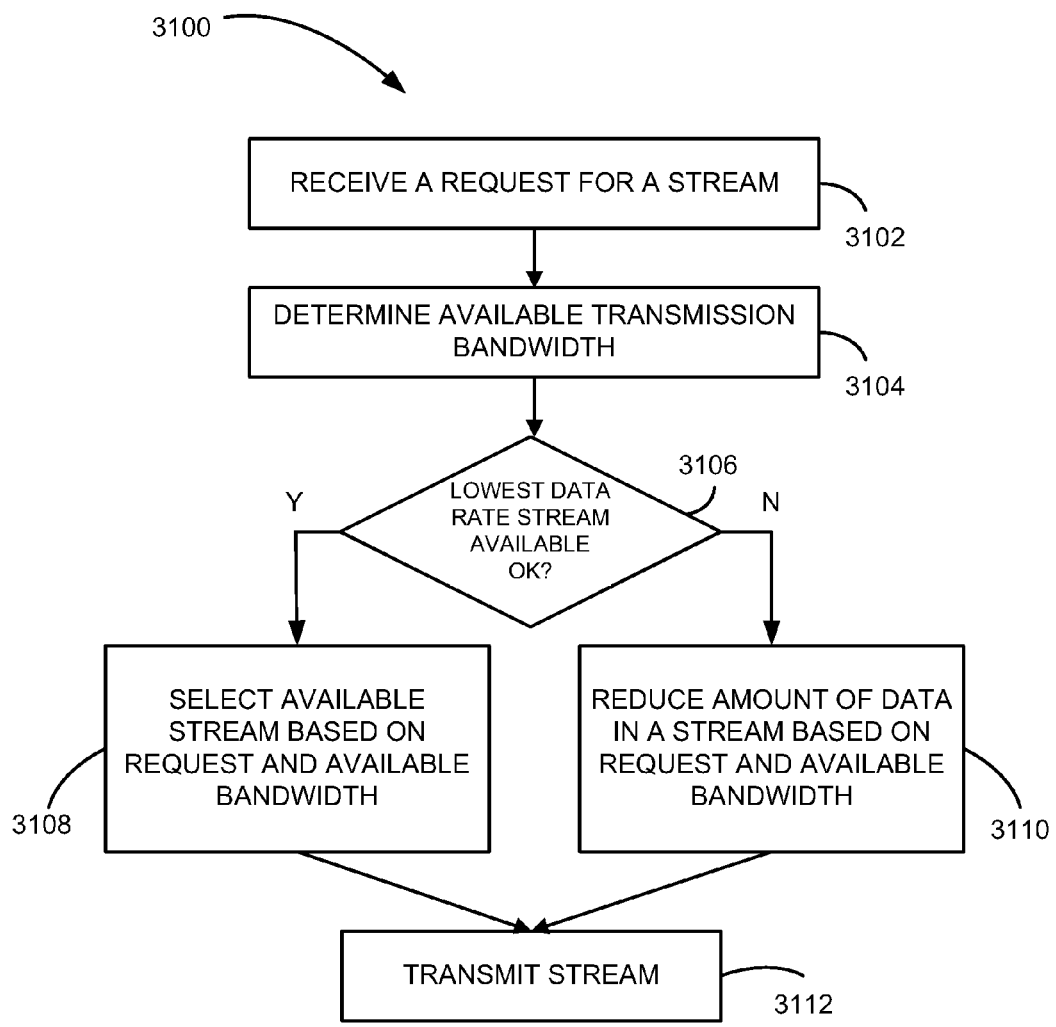
FIG. 31 is a flowchart of another method of operating a switch/router to distribute video data to at least one device in accordance with example embodiments.

Similarly, FIG. 31 is a flowchart of another example method 3100 of operating the router 2400 of FIG. 24 for distributing video data in which the router 2400 may reduce the size of a data stream itself to reduce its effective data rate. In the method 3100, the router 2400 may receive a request for a particular video stream (operation 3102). The router 2400 may then determine the available transmission bandwidth of the link between the router 2400 and the requesting device (operation 3104), possibly including analyzing the data rates for other data being transmitted from the router 2400 that may affect the link. The router 2400 may then determine if the lowest data rate stream that is available for the program of interest to the device is sufficient for preventing oversubscription of the link (operation 3106). If so, the router 2400 may select one of the available streams that most closely matches the requested stream (operation 3108) and transmit the selected stream to the requesting device (operation 3112). If, instead, the stream with the lowest data rate may cause communication delays or other problems for the requesting device or other devices coupled with the router 2400 (operation 3106), the router 2400 may then reduce the amount data in that stream (operation 3110) to reduce the data rate of the stream to satisfy the request while preventing oversubscription of the link, and then transmit the modified stream (operation 3112). Such a method 2400 may be employed in systems which may or may not employ a manifest to describe the various data rate streams available for a particular program or channel.

Figure 32:
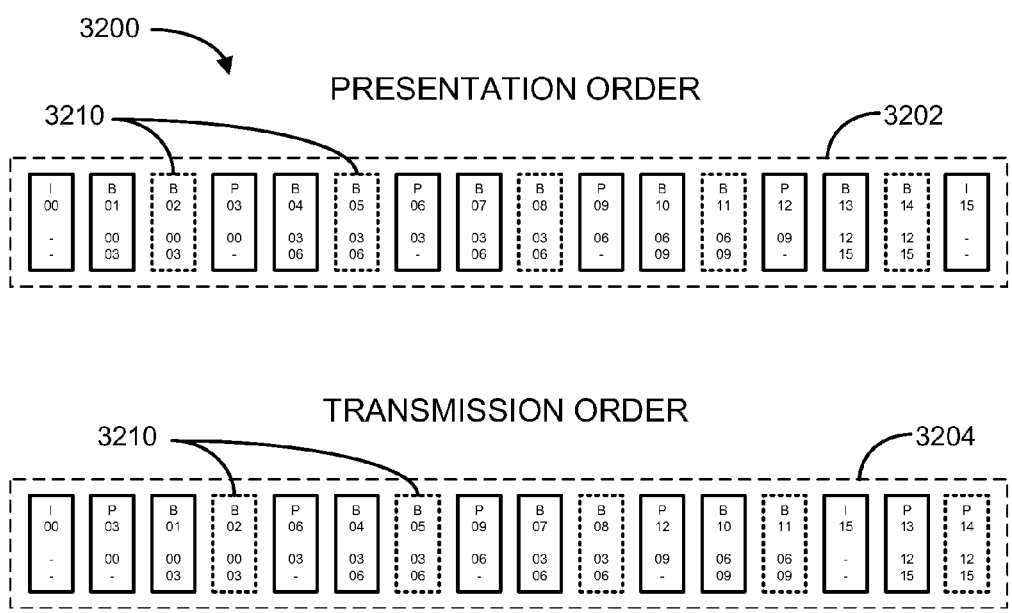
FIG. 32 is a diagram of a video data hierarchy in which at least some of the video data hierarchy is removed before transmission in accordance with example embodiments.

In some examples, the amount of data in a video stream may be reduced without re-encoding any video frames in the data hierarchy by deleting the most dependent frames in the data hierarchy (in other words, deleting at least some of those frames upon which no other frames depend). Thus, a reduced data rate stream would be generated without rendering the stream invalid from a decoding standpoint. In some systems in which a manifest was provided, the router 2400 may add any information for this new data stream to allow a device to explicitly request the stream. FIG. 32 provides a graphical example of an MPEG-2 GOP in presentation order 3202 and transmission order 3204 in which the router 2400 may delete some of the most dependent frames (B frames) 3210 before transmitting the GOP to the requesting device. In this example, fifty percent of the B frames are eliminated. The B-frames that are deleted to generate the new video stream are shown in dashed outline. Presuming the original data stream provides a frame rate of 30 frames per second, the reduced data stream 3200 may provide only 20 frames per second, thus possibly creating an uneven presentation of stream to the user, but reducing the data rate of the stream by approximately 20 percent, thus making delivery of the program to the device possible without oversubscribing the link from the router 2400 to the device.

Figure 33:
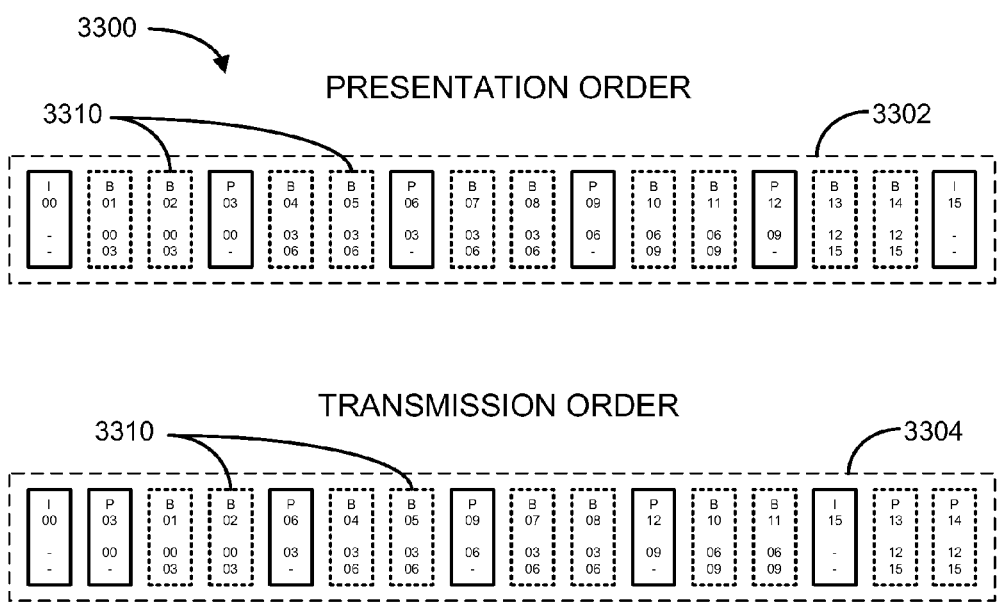
FIG. 33 is a diagram of a video data hierarchy in which more of the video data hierarchy is removed in comparison to the video data hierarchy of FIG. 32 before transmission in accordance with example embodiments.

FIG. 33 presents a graphical example of the same original MPEG-2 GOP in presentation order 3302 and transmission order 3304 in which the router 2400 deletes all of the B frames 3310, possibly resulting in a total reduction of the data rate of the reduced stream 3300 by about 40 percent. Such a reduction would further reduce the quality of the presentation by reducing the average presentation rate to about 10 frames per second, but would result in delivery of the desired program or channel without creating transmission problems and/or device buffer underruns in either the requesting device or other devices coupled with the router 2400. If more data rate reduction is required, one or more of the less-dependent frames (for example, the P frames) associated with the removed B frames may be eliminated to further reduce the data rate of the resulting video stream.

In other implementations, the router 2400 may perform more complicated data rate reduction of a data stream by, for example, reducing the resolution of selected frames in each GOP being transmitted. Such a data stream may reduce the overall video quality of the presentation, but may also provide a more consistent or even presentation of the video data to the user by maintaining the original presentation rate of the original video stream.

Example Computing System

Figure 34:
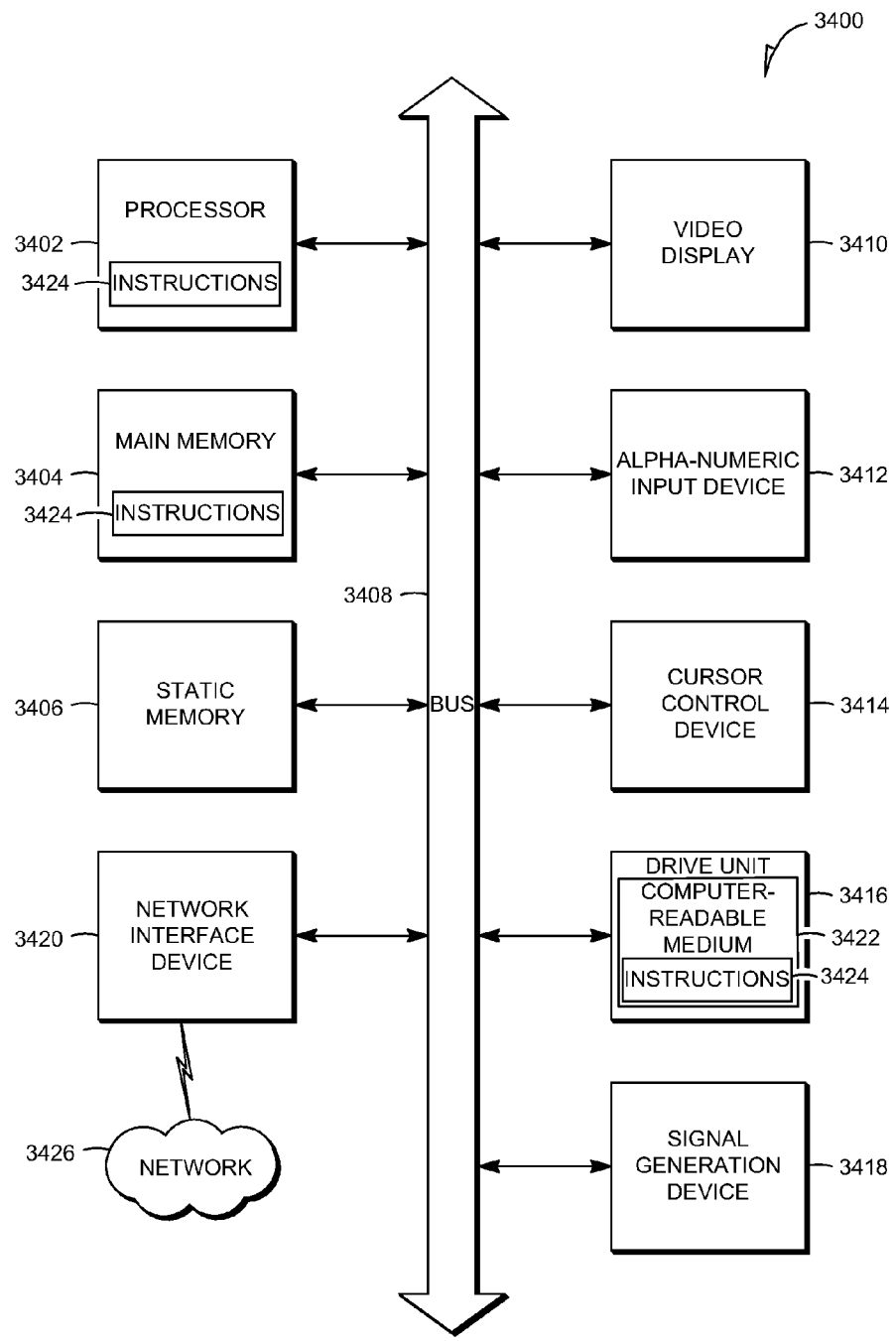
FIG. 34 illustrates a diagrammatic representation of machine in the example form of a computer system within which a set of instructions, for causing the machine to perform any one or more of the methodologies discussed herein, may be executed.

FIG. 34 shows a diagrammatic representation of machine in the example form of a computer system 3400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3400 includes a processor 3402 (e.g., a central processing unit (CPU), a graphics processing unit (GPU) or both), a main memory 3404 and a static memory 3406 which communicate with each other via a bus 3408. The computer system 3400 may further include a video display unit 3410 (e.g., a liquid crystal display (LCD) or a cathode ray tube (CRT)). The computer system 3400 also includes an alphanumeric input device 3412 (e.g., a keyboard), a user interface (UI) navigation device 3414 (e.g., a mouse), a disk drive unit 3416, a signal generation device 3418 (e.g., a speaker) and a network interface device 3420.

The disk drive unit 3416 includes a machine-readable medium 3422 on which is stored one or more sets of instructions and data structures (e.g., software 3424) embodying or utilized by any one or more of the methodologies or functions described herein. The software 3424 may also reside, completely or at least partially, within the main memory 3404 and/or within the processor 3402 during execution thereof by the computer system 3400, the main memory 3404 and the processor 3402 also constituting machine-readable media.

The software 3424 may further be transmitted or received over a network 3426 via the network interface device 3420 utilizing any one of a number of well-known transfer protocols (e.g., HTTP).

While the machine-readable medium 3422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for transmitting video data, the method comprising:
  receiving a plurality of streams of video data from at least one data source into at least one buffer of a router via a multicast interface of the router, wherein each of the plurality of streams of video data represents a same video program, wherein each of the plurality of streams of video data corresponds to a unique visual resolution relative to at least some other streams of the plurality of streams, and wherein each of the plurality of streams of video data comprises a plurality of contiguous, non-overlapping portions of video data;
  receiving a request from a device to transmit a single one of the portions of video data to the device; and
  transmitting, in response to the request, a portion of one of the plurality of streams of video data from the at least one buffer of the router over a communication path from the router to the device using a point-to-point transmission protocol.

2. The method of claim 1, further comprising:
  transmitting, from the router to the device, data rate information regarding a data rate of each of the plurality of streams of video data, wherein one of the plurality of streams of video data having a higher video resolution compared to another of the plurality of streams of video data comprises a higher data rate compared to the other of the plurality of streams of video data.

3. The method of claim 2, further comprising:
  receiving, via the multicast interface, the data rate information prior to transmitting the data rate information to the device.

4. The method of claim 2, further comprising:
  apportioning, at the router, each of the plurality of streams of video data into the plurality of portions; and
  generating, at the router, the data rate information based on the apportioning of each of the plurality of streams of video data.

5. The method of claim 2, wherein the request comprises a selection of one of the plurality of streams of video data from which the single one of the portions of video data is requested to be transmitted to the device, wherein the indication is based on the data rate information, and wherein the single one of the portions of video data to be transmitted to the device is from the selected one of the plurality of streams of video data.

6. The method of claim 5, wherein the selection is further based on a current communication link quality of the communication path from the router to the device.

7. The method of claim 5, wherein the selection is further based on a transmission bandwidth of the communication path from the router to the device.

8. The method of claim 1, further comprising:
  selecting, at the router, one of the plurality of streams of video data from which the single one of the portions of video data is to be transmitted to the device.

9. The method of claim 8, wherein the selection is based on at least one of a current communication link quality of the communication path from the router to the device or a transmission bandwidth of the communication path from the router to the device.

10. The method of claim 8, wherein the request comprises a desired one of the plurality of streams of video data from which the single one of the portions of video data is requested to be transmitted to the device, and wherein the selection is her based on the desired one of the plurality of streams of video data.

11. The method of claim 1, wherein:
  each of the plurality of streams of video data comprises hierarchical data comprising sequential data in which future video data depends on previous video data; and
  each portion of each of the plurality of streams of video data may be decoded at the device without reference to another portion of the stream of video data.

12. The method of claim 11, further comprising:
  generating, at the router, initial hierarchical data for each of at least some portions of at least one of the plurality of streams of video data, wherein the initial hierarchical data includes an access point to enable decoding, at the device, of a corresponding portion of the at least one of the plurality of streams of video data without reference to another portion of the at least one of the plurality of streams of video data.

13. The method of claim 1, wherein the point-to-point transmission protocol comprises at least one of a user datagram protocol or a transmission control protocol.

14. A router for transmitting video data, the system comprising:
  at least one buffer configured to store at least one portion of each of a plurality of streams of video data, wherein each of the plurality of streams of video data corresponds to a unique visual resolution relative to at least some other streams of the plurality of streams, and wherein each of the plurality of streams of video data comprises a plurality of contiguous, non-overlapping portions of video data;
  a multicast interface configured to receive the plurality of streams of video data from at least one data source;
  a point-to-point interface configured to receive a request from a device to transmit a single portion of video data to the device, and in response to the request, to transmit a portion of one of the plurality of streams of video data from the at least one buffer to the device over a communication path from the outer to the de-ice using a point-to-point transmission protocol; and
  control logic configured to process the request to select the one of the plurality of streams of video data from which the portion is to be transmitted to the device.

15. The router of claim 14, wherein:
  the at least one buffer is further configured to store data rate information regarding a data rate of each of the plurality of streams of video data, wherein one of the plurality of streams of video data having a higher video resolution compared to another of the plurality of streams of video data comprises a higher data rate compared to the other of the plurality of streams of video data.

16. The router of claim 15, wherein:
  the control logic is further configured to select the one of the plurality of streams of video data based on the data rate information.

17. The router of claim 15, wherein:
  the control logic is further configured to transmit data rate information via the point-to-point interface to the device.

18. The router of claim 15, wherein:
the control logic is further configured to receive the data rate information from the at least one data source via the multicast interface.

19. The router of claim 15, wherein the control logic is further configured to:
apportion each of the plurality of streams of video data into the plurality of portions; and
generate the data rate information based on the apportioning of each of the plurality of streams of video data.

20. The router of claim 14, wherein:
each of the plurality of streams of video data includes hierarchical data comprising sequential data in which future video data depends on previous video data; and
the control logic is further configured to generate initial hierarchical data for each of at least some portions of at least one of the plurality of streams of video data, wherein the initial hierarchical data includes an access point to enable decoding, at the device, of a corresponding portion of the at least one of the plurality of streams of video data without reference to another portion of the at least one of the plurality of streams of video data.

21. A non-transitory computer-readable storage medium comprising instructions that, when executed by at least one processor of a machine, cause the machine to perform operations comprising:
receiving a plurality of streams of video data from at least one data source into at least one buffer of a router via a multicast interface of the router, wherein each of the plurality of streams of video data represents a same video program, wherein each of the plurality of streams of video data corresponds to a unique visual resolution relative to at least some other streams of the plurality of streams, and wherein each of the plurality of streams of video data comprises a plurality of contiguous, non-overlapping portions of video data;
receiving a request from a device to transmit a single one of the portions of video data to the device; and
transmitting, in response to the request, a portion of one of the plurality of streams of video data from the at least one buffer of the router over a communication path from the router to the device using a point-to-point transmission protocol.

\* \* \* \* \*